United States Patent
Yang et al.

(10) Patent No.: US 10,980,049 B2
(45) Date of Patent: Apr. 13, 2021

(54) ALLOCATING PHYSICAL UPLINK CONTROL CHANNEL (PUCCH) RESOURCES FOR ULTRA-RELIABLE LOW LATENCY COMMUNICATION (URLLC)

(71) Applicant: QUALCOMM Incorporated, San Diego, CA (US)

(72) Inventors: Wei Yang, San Diego, CA (US); Jing Jiang, San Diego, CA (US); Yi Huang, San Diego, CA (US); Renqiu Wang, San Diego, CA (US); Wanshi Chen, San Diego, CA (US); Peter Gaal, San Diego, CA (US); Chih-Ping Li, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/406,667

(22) Filed: May 8, 2019

(65) Prior Publication Data
US 2019/0349973 A1    Nov. 14, 2019

Related U.S. Application Data

(60) Provisional application No. 62/669,941, filed on May 10, 2018.

(51) Int. Cl.
*H04W 72/12*    (2009.01)
(52) U.S. Cl.
CPC ... *H04W 72/1284* (2013.01); *H04W 72/1257* (2013.01); *H04W 72/1289* (2013.01)

(58) Field of Classification Search
CPC .............. H04L 5/0055; H04L 5/0092; H04W 72/1257; H04W 72/1284; H04W 72/1289
See application file for complete search history.

(56) References Cited

U.S. PATENT DOCUMENTS

| 10,411,864 B2 * | 9/2019 | Wang ................... H04W 72/04 |
| 2018/0132264 A1 * | 5/2018 | Jung .................... H04L 1/1812 |
| 2018/0199334 A1 * | 7/2018 | Ying ................. H04W 72/0413 |
| 2018/0324786 A1 * | 11/2018 | Hooli .................. H04L 5/0053 |
| 2019/0190644 A1 * | 6/2019 | Ugurlu ............... H04W 72/042 |

(Continued)

OTHER PUBLICATIONS

International Search Report and Written Opinion—PCT/US2019/031544—ISA/EPO—dated Oct. 18, 2019.

(Continued)

*Primary Examiner* — Kashif Siddiqui
(74) *Attorney, Agent, or Firm* — QUALCOMM Incorporated

(57) ABSTRACT

Various aspects of the present disclosure generally relate to wireless communication. In some aspects, a user equipment (UE) may determine whether a physical uplink control channel (PUCCH) transmission is associated with a first type of service or a second type of service, wherein the second type of service is associated with a higher reliability or a lower latency than the first type of service. The UE may transmit the PUCCH transmission using a first set of resources when the PUCCH transmission is associated with the first type of service or using a second set of resources when the PUCCH transmission is associated with the second type of service. Numerous other aspects are provided.

44 Claims, 14 Drawing Sheets

(56) References Cited

U.S. PATENT DOCUMENTS

| | | | |
|---|---|---|---|
| 2019/0268120 A1* | 8/2019 | Gao | H04L 5/0051 |
| 2019/0364563 A1* | 11/2019 | Jung | H04W 72/042 |
| 2020/0045722 A1* | 2/2020 | Bae | H04W 72/04 |
| 2020/0083997 A1* | 3/2020 | Takata | H04W 72/042 |

OTHER PUBLICATIONS

Nokia et al., "PUCCH Resource Allocation", 3GPP Draft; R1-1720014_PUCCH Resource Allocation, 3rd Generation Partnership Project (3GPP), Mobile Competence Centre ; 650, Route Des Lucioles ; F-06921 Sophia-Antipolis Cedex; France, vol. RAN WG1, No. Reno, Nevada, USA; Nov. 27, 2017-Dec. 1, 2017, Nov. 17, 2017 (Nov. 17, 2017), XP051369221, 11 Pages, Retrieved from the Internet: URL:http://www.3gpp.org/ftp/tsg%5Fran/WG1%5FRL1/TSGR1%5F91/Docs/ [retrieved on Nov. 17, 2017], p. 1-p. 2.

Panasonic: "Discussion on resource allocation for uplink control channel", 3GPP Draft; R1-1720451, 3rd Generation Partnership Project (3GPP), Mobile Competence Centre ; 650, Route Des Lucioles; F-06921 Sophia-Antipolis Cedex; France, vol. RAN WG1, No. Reno, USA; Nov. 27, 2017-Dec. 1, 2017, Nov. 17, 2017 (Nov. 17, 2017), XP051368991, 9 Pages, Retrieved from the Internet: URL:http://www.3gpp.org/ftp/tsg%5Fran/WG1%5FRL1/TSGR1%5F91/Docs/ [retrieved on Nov. 17, 2017], section 2.4; p. 2.

Partial International Search Report—PCT/US2019/031544—ISA/EPO—dated Aug. 21, 2019.

ZTE et al., "NR compact DCI format for URLLC", 3GPP Draft; R1-1803801 NR Compact DCI Format for URLLC, 3rd Generation Partnership Project (3GPP), Mobile Competence Centre ; 650, Route Des Lucioles ; F-06921 Sophia-Antipolic Cedex; France, vol. RAN WG1, No. Sanya, China; Apr. 16, 2018-Apr. 20, 2018, Apr. 6, 2018 (Apr. 6, 2018), XP051412983, 7 pages, Retrieved from the Internet: URL:http://www.3gpp.org/ftp/tsg%5Fran/WG1%5FRL1/TSGR1%5F92b/Docs/ [retrieved on Apr. 6, 2018], p. 3.

* cited by examiner

ALLOCATING PHYSICAL UPLINK CONTROL CHANNEL (PUCCH) RESOURCES FOR ULTRA-RELIABLE LOW LATENCY COMMUNICATION (URLLC)

CROSS-REFERENCE TO RELATED APPLICATIONS UNDER 35 U.S.C. § 119

This application claims priority to U.S. Provisional Patent Application No. 62/669,941, filed on May 10, 2018, entitled "TECHNIQUES AND APPARATUSES FOR ALLOCATING PHYSICAL UPLINK CONTROL CHANNEL (PUCCH) RESOURCES FOR ULTRA-RELIABLE LOW LATENCY COMMUNICATION (URLLC)," which is hereby expressly incorporated by reference herein.

FIELD OF THE DISCLOSURE

Aspects of the present disclosure generally relate to wireless communication and to techniques and apparatuses for allocating physical uplink control channel (PUCCH) resources for ultra-reliable low latency communication (URLLC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining whether a physical uplink control channel (PUCCH) transmission is associated with a first type of service or a second type of service, wherein the second type of service is associated with a higher reliability or a lower latency than the first type of service; and transmitting the PUCCH transmission using a first set of resources when the PUCCH transmission is associated with the first type of service or using a second set of resources when the PUCCH transmission is associated with the second type of service.

In some aspects, a UE for wireless communication may include memory and one or more processors coupled to the memory. The memory and the one or more processors may be configured to determine whether a PUCCH transmission is associated with a first type of service or a second type of service, wherein the second type of service is associated with a higher reliability or a lower latency than the first type of service; and transmit the PUCCH transmission using a first set of resources when the PUCCH transmission is associated with the first type of service or using a second set of resources when the PUCCH transmission is associated with the second type of service.

In some aspects, a non-transitory computer-readable medium may store one or more instructions for wireless communication. The one or more instructions, when executed by one or more processors of a UE, may cause the one or more processors to determine whether a PUCCH transmission is associated with a first type of service or a second type of service, wherein the second type of service is associated with a higher reliability or a lower latency than the first type of service; and transmit the PUCCH transmission using a first set of resources when the PUCCH transmission is associated with the first type of service or using a second set of resources when the PUCCH transmission is associated with the second type of service.

In some aspects, an apparatus for wireless communication may include means for determining whether a PUCCH transmission is associated with a first type of service or a second type of service, wherein the second type of service is associated with a higher reliability or a lower latency than the first type of service; and means for transmitting the PUCCH transmission using a first set of resources when the PUCCH transmission is associated with the first type of service or using a second set of resources when the PUCCH transmission is associated with the second type of service.

In some aspects, a method of wireless communication, performed by a UE, may include receiving a PUCCH configuration comprising a first set of parameters for transmissions associated with a first service type and a second set of parameters for transmissions associated with a second service type; generating uplink control information (UCI);

and transmitting a message that includes the UCI according to the PUCCH configuration and a service type of the message.

In some aspects, a UE for wireless communication may include memory and one or more processors coupled to the memory. The memory and the one or more processors may be configured to receive a PUCCH configuration comprising a first set of parameters for transmissions associated with a first service type and a second set of parameters for transmissions associated with a second service type; generate UCI; and transmit a message that includes the UCI according to the PUCCH configuration and a service type of the message.

In some aspects, a non-transitory computer-readable medium may store one or more instructions for wireless communication. The one or more instructions, when executed by one or more processors of a UE, may cause the one or more processors to receive a PUCCH configuration comprising a first set of parameters for transmissions associated with a first service type and a second set of parameters for transmissions associated with a second service type; generate UCI; and transmit a message that includes the UCI according to the PUCCH configuration and a service type of the message.

In some aspects, an apparatus for wireless communication may include means for receiving a PUCCH configuration comprising a first set of parameters for transmissions associated with a first service type and a second set of parameters for transmissions associated with a second service type; means for generating UCI; and means for transmitting a message that includes the UCI according to the PUCCH configuration and a service type of the message.

In some aspects, a method of wireless communication, performed by a base station, may include determining a first configuration of PUCCH resources to be used for PUCCH transmissions associated with a first type of service; determining a second configuration of PUCCH resources to be used for PUCCH transmissions associated with a second type of service, wherein the second type of service is associated with a higher reliability or a lower latency than the first type of service; and transmitting the first configuration and the second configuration to a UE.

In some aspects, a base station for wireless communication may include memory and one or more processors coupled to the memory. The memory and the one or more processors may be configured to determine a first configuration of PUCCH resources to be used for PUCCH transmissions associated with a first type of service; determine a second configuration of PUCCH resources to be used for PUCCH transmissions associated with a second type of service, wherein the second type of service is associated with a higher reliability or a lower latency than the first type of service; and transmit the first configuration and the second configuration to a UE.

In some aspects, a non-transitory computer-readable medium may store one or more instructions for wireless communication. The one or more instructions, when executed by one or more processors of a base station, may cause the one or more processors to determine a first configuration of PUCCH resources to be used for PUCCH transmissions associated with a first type of service; determine a second configuration of PUCCH resources to be used for PUCCH transmissions associated with a second type of service, wherein the second type of service is associated with a higher reliability or a lower latency than the first type of service; and transmit the first configuration and the second configuration to a UE.

In some aspects, an apparatus for wireless communication may include means for determining a first configuration of PUCCH resources to be used for PUCCH transmissions associated with a first type of service; means for determining a second configuration of PUCCH resources to be used for PUCCH transmissions associated with a second type of service, wherein the second type of service is associated with a higher reliability or a lower latency than the first type of service; and means for transmitting the first configuration and the second configuration to a UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
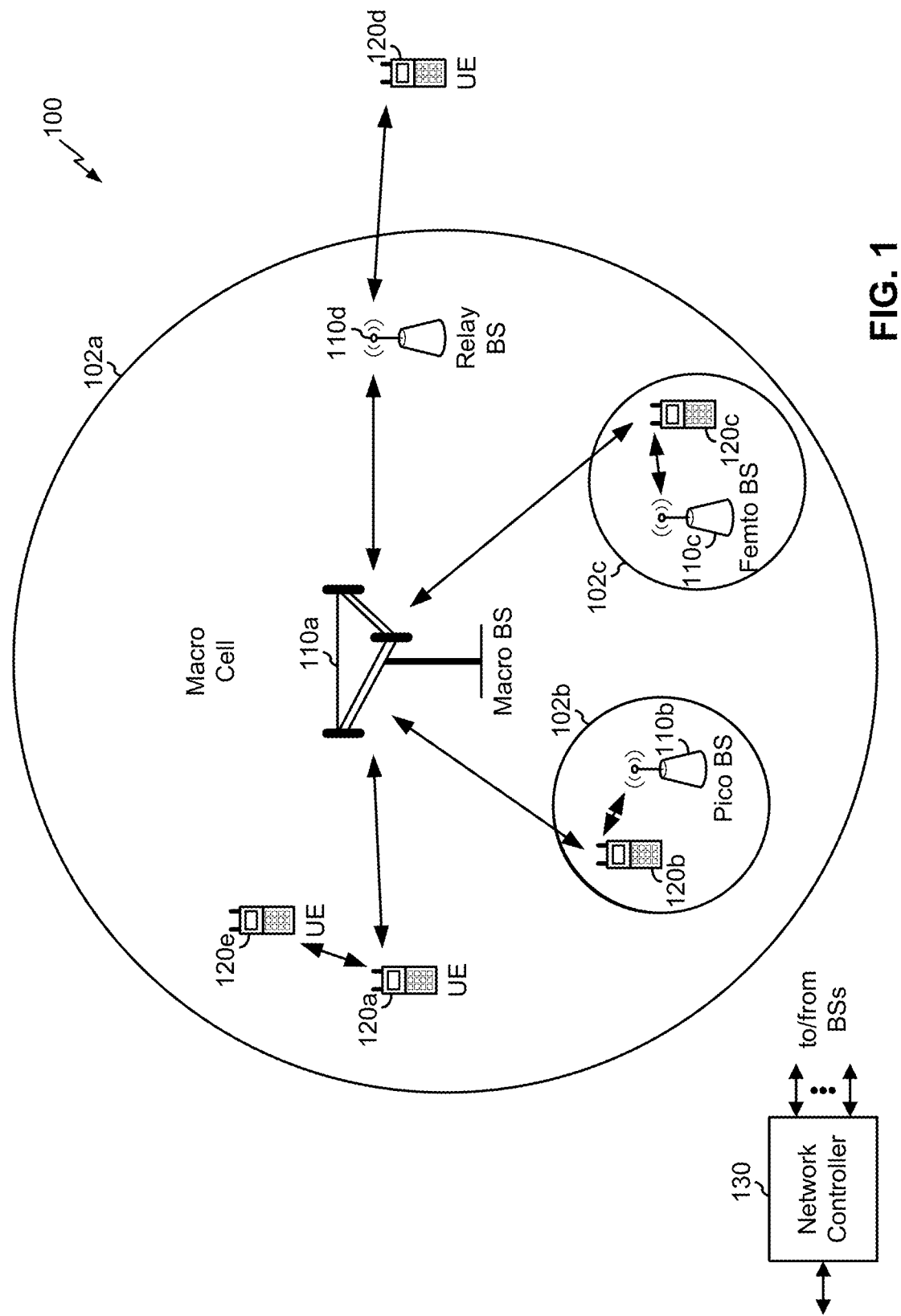
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
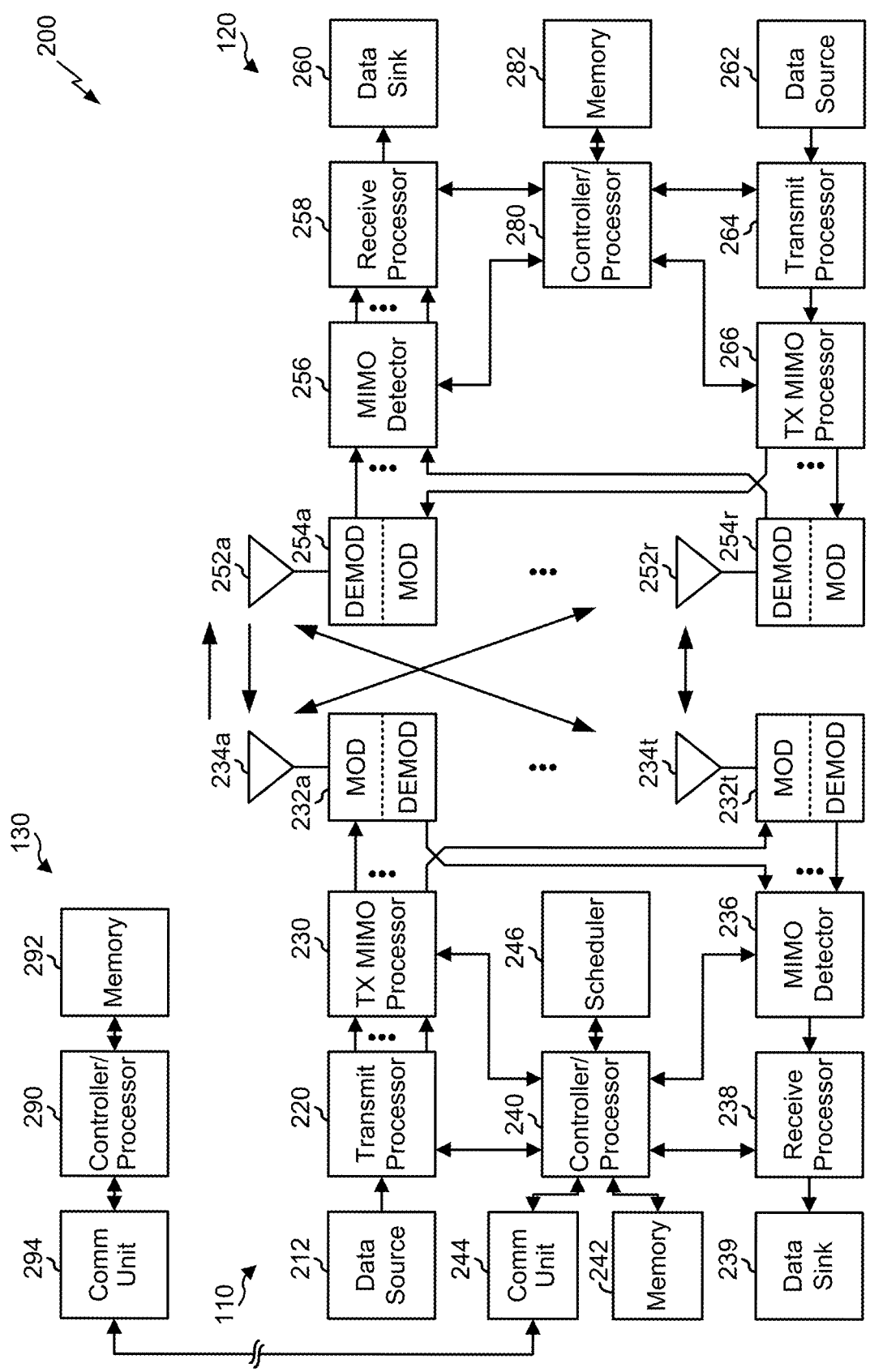
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with allocating physical uplink control channel (PUCCH) resources for ultra-reliable low latency communication (URLLC), as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining whether a PUCCH transmission is associated with a first type of service or a second type of service, wherein the second type of service is associated with a higher reliability or a lower latency than the first type of service; means for transmitting the PUCCH transmission using a first set of resources when the PUCCH transmission is associated with the first type of service or using a second set of resources when the PUCCH transmission is associated with the second type of service; and/or the like. Additionally, or alternatively, UE 120 may include means for receiving a PUCCH configuration comprising a first set of parameters for transmissions associated with a first service type and a second set of parameters for transmissions associated with a second service type; means for generating UCI; means for transmitting a message that includes the UCI according to the PUCCH configuration and a service type of the message; and/or the like. In some aspects, such means may include one or more components of UE 120 described in connection with FIG. 2.

In some aspects, base station 110 may include means for determining a first configuration of PUCCH resources to be used for PUCCH transmissions associated with a first type of service; means for determining a second configuration of PUCCH resources to be used for PUCCH transmissions associated with a second type of service, wherein the second type of service is associated with a higher reliability or a lower latency than the first type of service; means for transmitting the first configuration and the second configuration to a UE; and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
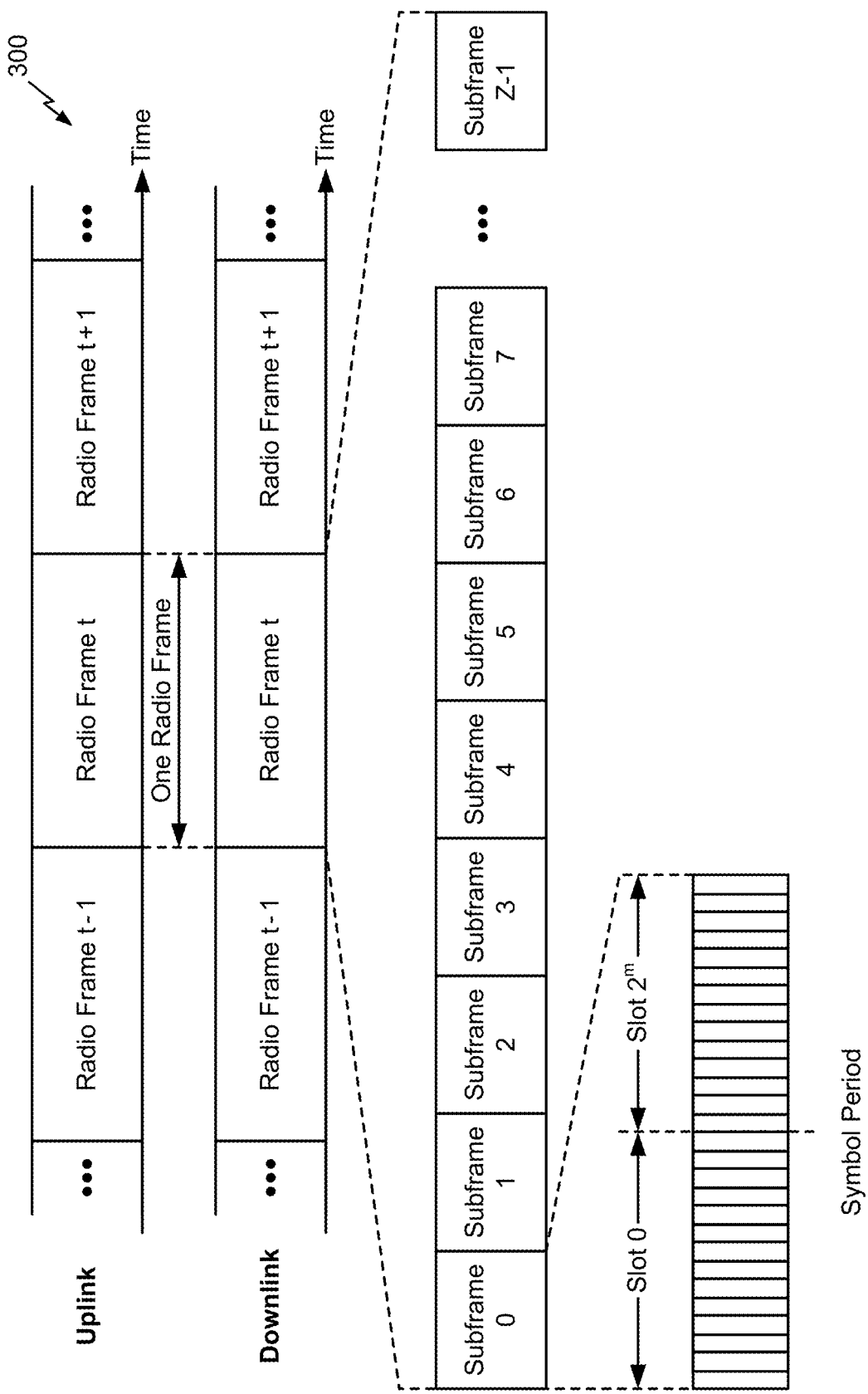
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
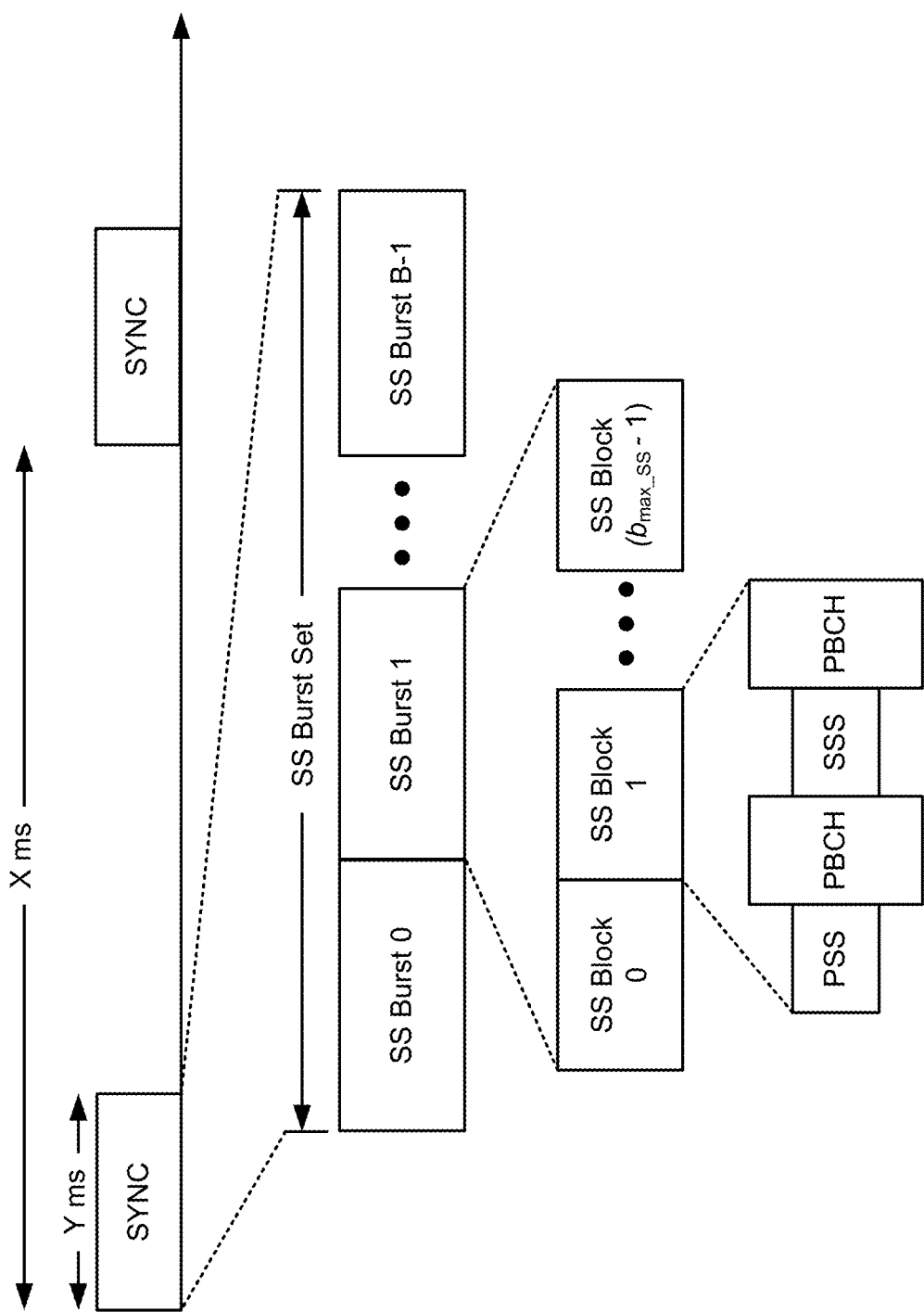
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
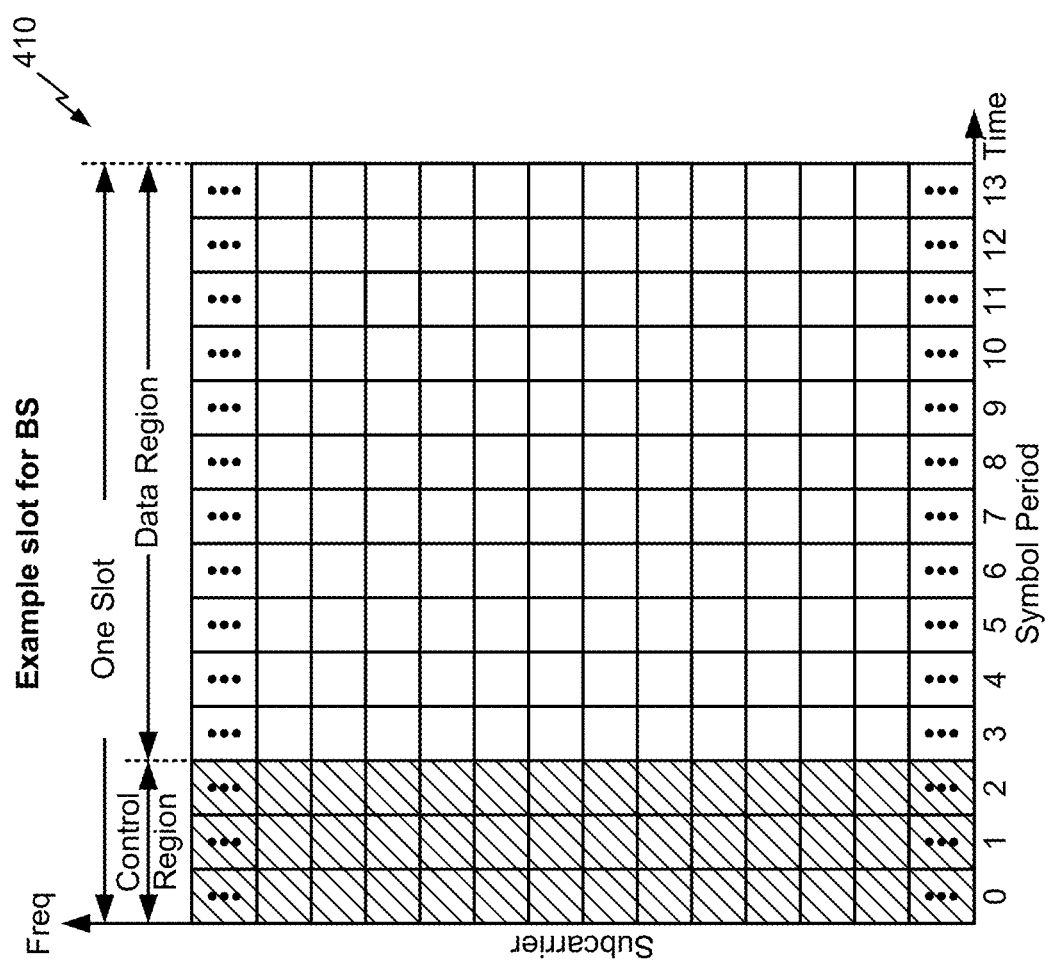
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
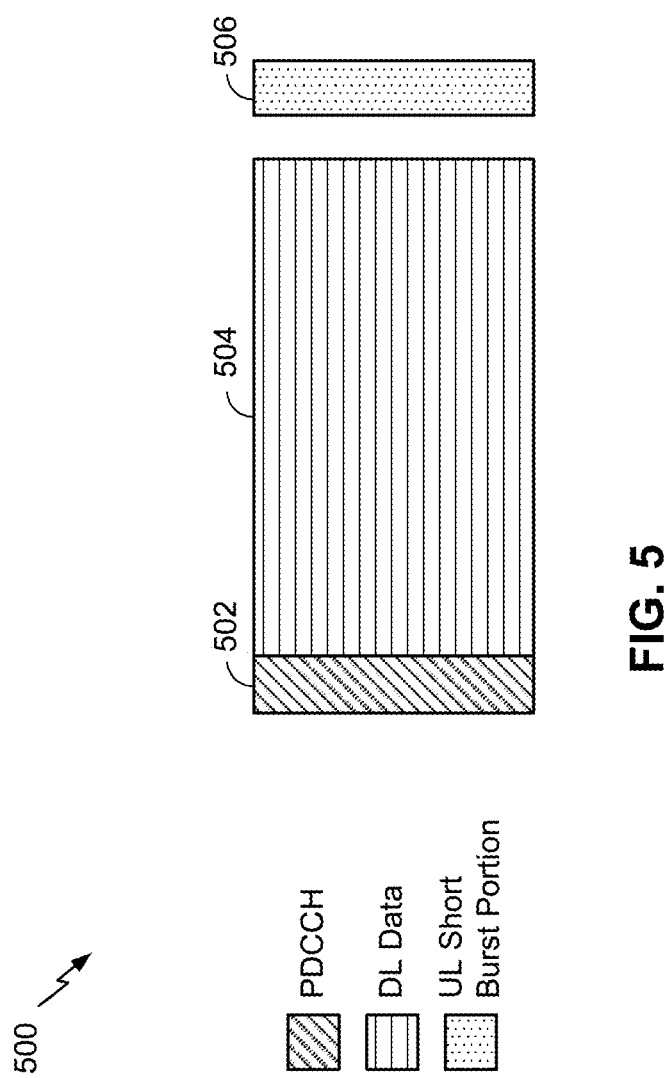
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples may differ from what is described with regard to FIG. 5.

Figure 6:
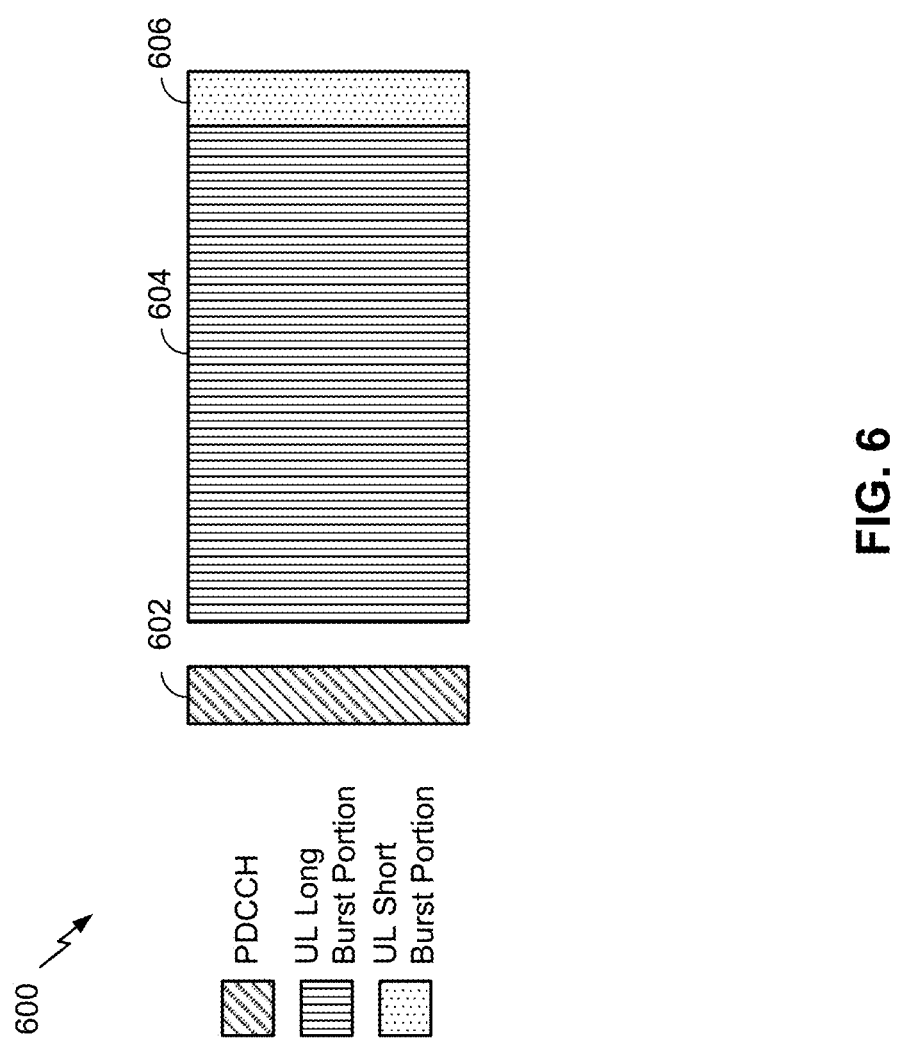
FIG. 6 is a diagram illustrating an example of an uplink (UL)-centric slot, in accordance with various aspects of the present disclosure.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided merely as an example. Other examples may differ from what is described with regard to FIG. 6.

In some instances, a BS and UE may communicate with one another via multiple types of services. For example, a first communication between the BS and the UE may use an enhanced mobile broadband (eMBB) service and a second communication between the BS and the UE may use an ultra-reliable low latency communication (URLLC) service. In such cases, the different types of services may have different characteristics and/or requirements, such as different latency and/or reliability requirements (e.g., a URLLC service has a higher reliability and lower latency requirement than eMBB). However, in some cases, the same sets of PUCCH resources may be allocated for communications between the BS and the UE regardless of the type of service (e.g., eMBB or URLLC) that is being used for the communication. Accordingly, a long PUCCH resource (e.g., 14 symbols) may not be useful for URLLC due to the rather large latency associated with the long PUCCH resource. On the other hand, URLLC PUCCH resources may need to be configured more frequently (e.g., every two symbols) to meet the low latency requirement, which is not necessary for eMBB services.

Furthermore, in some instances, downlink control information (DCI) may be different depending on the type of service being used. For example, the DCI may include different signaling methods for PUCCH resource allocation for eMBB than the signaling methods included in the DCI for URLLC. As such, when PUCCH resources are allocated regardless of the type of service that is to be used for a PUCCH transmission, the UE may improperly interpret which of the resources are to be used for a particular PUCCH transmission.

Furthermore, in some instances, when two PUCCH channels (e.g. one for eMBB and one for URLLC) are overlapping in time, the UE may need to multiplex uplink control information (UCI) bits for both channels (e.g., for both eMBB and URLLC) and transmit the UCI in a single channel. However, this can have a negative effect on reliability, because the multiplexed UCI does not indicate whether URLLC packets or eMBB packets have been properly received. The multiplexed UCI simply indicates a total number of packets received, regardless of the type of service that is associated with the packets. Furthermore, in some instances, the UE may use different timing for different types of services. For example, there may be a different response timing for eMBB acknowledgement or negative acknowledgement (ACK/NACK) than response timing for URLLC ACK/NACK. In some cases, ACK/NACK may be referred to as hybrid automatic repeat request acknowledgement (HARQ-ACK). Similarly, ACK/NACK feedback may be referred to as HARQ-ACK feedback, ACK/NACK information may be referred to as HARQ-ACK information, and/or the like.

Some aspects described herein provide resource allocation for PUCCH resources in connection with the type of service that is to be used for a PUCCH transmission. For example, the UE may send a PUCCH transmission using first sets of resources when the PUCCH transmission is associated with a first type of service (e.g., eMBB) and second sets of resources when the PUCCH transmission is associated with the second type of service (e.g., URLLC). Furthermore, some aspects described herein may identify a resource for a PUCCH transmission from signaling in the DCI based at least in part on the type of service that is associated with the PUCCH transmission to ensure that the proper resource is monitored and/or used. Some aspects described herein may use separate PUCCH resources to transmit a PUCCH transmission with UCI based at least in part on the type of service that is associated with the PUCCH transmission. For example, a downlink assignment index (DAI) operation performed for a PUCCH transmission associated with an eMBB service may be different than a DAI operation performed for a PUCCH transmission associated with a URLLC service.

Accordingly, some examples provided herein may allow for different PUCCH resources to be dynamically allocated or used for PUCCH transmission based at least in part on the type of service. For example, depending on the requirements of the service associated with the PUCCH transmission, the PUCCH transmission may achieve a higher reliability and/or lower latency for one type of service over another by using relatively fewer sets of PUCCH resources and/or relatively fewer resources in each set of resources for the PUCCH transmission. Additionally, or alternatively, another type of service, that may not require such high reliability or low latency, can conserve signaling bandwidth and be configured using a larger number of sets of PUCCH resources and/or a greater number or resources within the sets of resources. Accordingly, some examples herein may conserve network resources while increasing reliability and/or decreasing latency as needed depending on a service associated with a PUCCH transmission.

Figure 7:
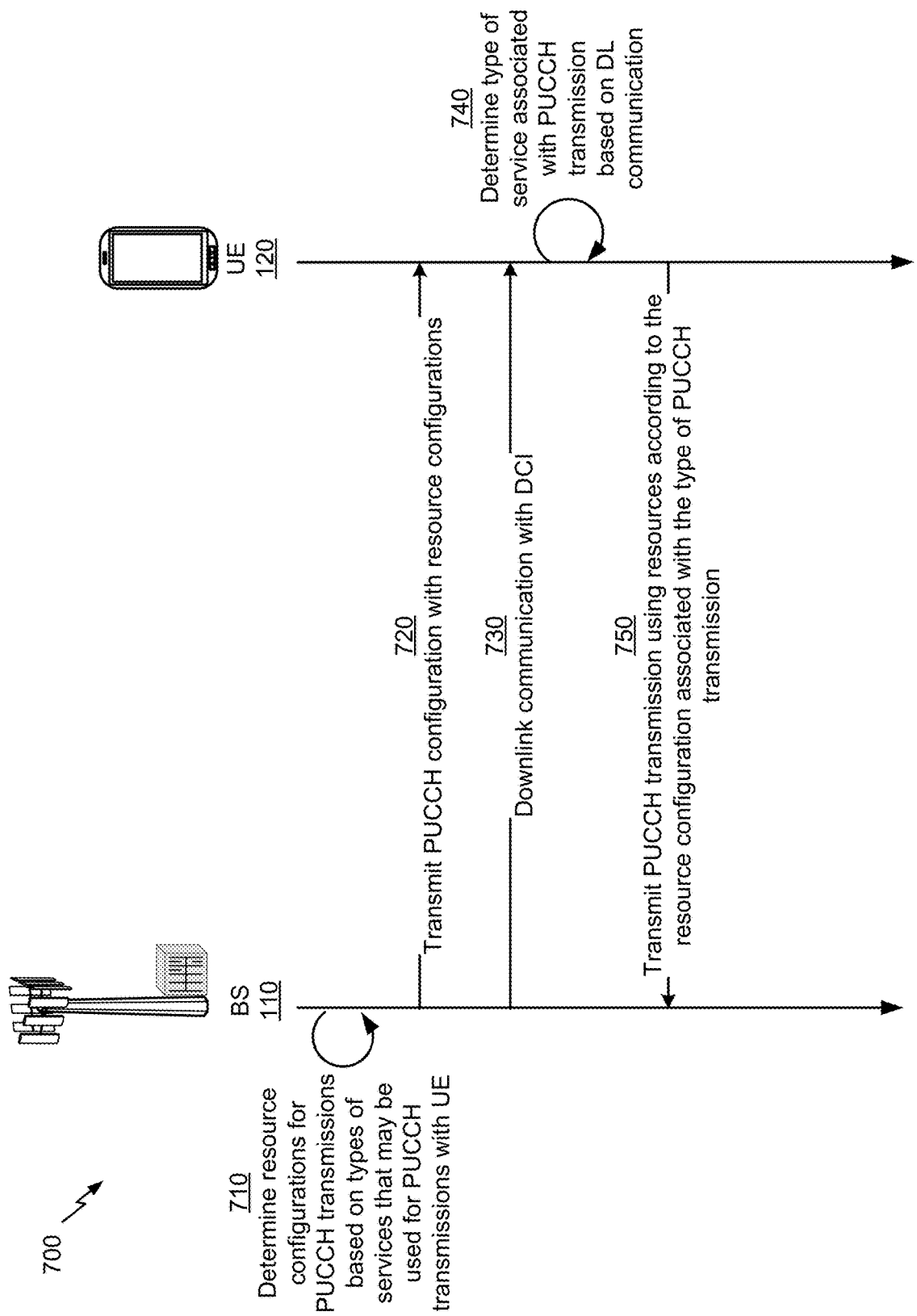
FIGS. 7-9 are diagrams illustrating an example of allocating physical uplink control channel (PUCCH) resources for ultra-reliable low latency communication (URLLC), in accordance with various aspects of the present disclosure.

FIG. 7 is a diagram illustrating an example 700 of allocating physical uplink control channel (PUCCH) resources for ultra-reliable low latency communication (URLLC), in accordance with various aspects of the present disclosure. In example 700, BS 110 and UE 120 exchange a plurality of transmissions (or communications) with one another. In some instances, the transmissions may be associated with a first type of service and in some instances the transmissions may be associated with a second type of service. As described in the following examples, the first type of service may be an eMBB service and the second type of service may be a URLLC service, although the first and second types of services may be different services. For example, the second type of service may have a lower latency requirement than the first type of service, may have a higher reliability requirement than the first type of service, may be associated with a higher priority than the first type of service, may be associated with a faster processing time (e.g., a shorter processing timeline) than the first type of service, and/or the like.

In example 700, because certain transmissions may be associated with different types of services, that operate according to different parameters (e.g., URLLC provides a higher reliability and/or lower latency than eMBB), BS 110 and UE 120 may configure and/or use PUCCH resources based at least in part on the type of service that is associated with the transmissions.

As shown in FIG. 7, and by reference number 710, BS 110 determines resource configurations for PUCCH transmissions based at least in part on types of services that may be used for PUCCH transmissions with UE 120. For example, BS 110 may determine a first configuration of PUCCH resources to be used for PUCCH transmissions when the PUCCH transmissions are associated with eMBB and a second configuration of PUCCH resources to be used for the PUCCH transmission when the PUCCH transmission is associated with URLLC.

The configurations of PUCCH resources may identify a number of sets of PUCCH resources (e.g., resource blocks) that are to be used for the PUCCH transmissions, a number of resources that are to be included in the sets of resources, and/or the like. A PUCCH resource may include a set of resource blocks. In some cases, each set of PUCCH resources is associated with an uplink control information (UCI) payload range. For example, a first set of PUCCH resources may be configured to transmit UCI with a size of 1 bit or 2 bits, a second set of PUCCH resources may be configured to transmit UCI with a size of 3 bits to $X_1$ bits, a third set of PUCCH resources may be configured to transmit UCI with a size of $(X_1+1)$ bits to $X_2$ bits, and so on. For URLLC, a payload size of UCI is typically small to assist with achieving high reliability. Thus, fewer sets of PUCCH resources (e.g., one or two sets) may be needed for URLLC as compared to eMBB (e.g., which may use four sets). Accordingly, a first configuration for a PUCCH transmission using an eMBB service may include more sets of resources than a second configuration for PUCCH transmissions using a URLLC service.

In some cases, a URLLC PUCCH resource may be configured with a finer granularity than an eMBB PUCCH resource. For example, the eMBB PUCCH resource configuration may configure PUCCH resources with a length of a slot (e.g., 14 symbols), whereas the URLLC PUCCH resource configuration may configure PUCCH resources with a length of a sub-slot (or mini-slot) (e.g., less than 14 symbols). As a result, the eMBB PUCCH resource configuration may need to configure both short (e.g., 1 or 2 symbols) and long (e.g., 4 to 14 symbols) PUCCH resources, whereas the URLLC PUCCH resource configuration may only need to configured PUCCH resources smaller than the sub-slot (or mini-slot) length. Thus, fewer resources are needed in each PUCCH resource set for URLLC as compared to eMBB. Accordingly, for PUCCH transmissions associated with a URLLC service, each set of resources may include fewer resources than a PUCCH transmission that is associated with an eMBB service. In this case, while eMBB services may utilize a relatively long PUCCH (14 symbols), this may cause too high of a latency for URLLC service, which is to be configured more frequently (e.g., every 2 symbols) to achieve the low latency. For an eMBB service, it may not be necessary to configure so frequently, and doing so may be a waste of signaling bandwidth and/or network resources. Therefore, eMBB services may use sets and sizes of resources for PUCCH transmission configured for eMBB and URLLC services may use sets or sizes of resources for PUCCH transmissions that are configured for URLLC.

In some cases, a PUCCH resource may be used to transmit HARQ-ACK feedback associated with a downlink semi-persistent scheduling (SPS) transmission. A PUCCH resource for transmitting HARQ-ACK feedback for downlink SPS may be configured in a radio resource control (RRC) message as part of the downlink SPS configuration. For example, a periodic PUCCH resource may be configured in the RRC message, and that PUCCH resource may be used to periodically transmit PUCCH for downlink SPS transmissions. The PUCCH resource configuration for downlink SPS may indicate a PUCCH identifier (PUCCH ID) that identifies the PUCCH resource to be used for the HARQ-ACK feedback. However, when downlink SPS is separately configured for eMBB and URLLC, the base station 110 may need to indicate not only a PUCCH ID, but also whether the PUCCH resource is associated with a URLLC transmission (or an eMBB transmission or other service type). In this case, the UE 120 may select a PUCCH resource from the set of PUCCH resources configured for URLLC transmissions. Accordingly, BS 110 may determine separate configurations for the PUCCH resources associated with downlink SPS transmission based at least in part on the types of services (e.g., eMBB or URLLC) used in communications between BS 110 and UE 120. For example, for PUCCH resources associated with downlink SPS, BS 110 may determine a first configuration of PUCCH resources to be used for PUCCH transmissions when the PUCCH and the downlink SPS transmissions are associated with eMBB, and a second configuration of PUCCH resources to be used for the PUCCH transmissions when the PUCCH and the downlink SPS transmissions are associated with URLLC.

In some aspects, BS 110 may determine a resource configuration that indicates that a same set of PUCCH resources may be accessible to UE 120 for PUCCH transmissions, but the resource configuration may assign a parameter to each of the PUCCH resources that allocates the PUCCH resources for use with a first type of service, a second type of service, or both types of service. For example, BS 110 may assign a parameter to each PUCCH resource, via the resource configuration for the PUCCH transmission, that indicates whether each PUCCH resource is to be used with eMBB, URLLC, or both eMBB and URLLC. As a result, as described herein, UE 120 may access a same set of PUCCH resources for both eMBB transmissions and URLLC transmissions, and select the appropriate resources for the PUCCH transmission according to the parameter and information received in the DCI (e.g., that identifies the PUCCH resources and/or a starting symbol of the PUCCH resources).

As further shown in FIG. 7, and by reference number 720, BS 110 transmits a PUCCH configuration with the resource configurations to UE 120. In some aspects, the PUCCH configuration may include a first set of parameters for transmissions or communications associated with a first type of service (e.g., eMBB) and a second set of parameters for transmissions associated with a second type of service (e.g., URLLC). Additionally, or alternatively, BS 110 may send individual PUCCH configurations for the first type of service and the second type of service. For example, BS 110 may send a first PUCCH configuration for eMBB and a second PUCCH configuration for URLLC. In some aspects a maximum coding rate may be different for eMBB and URLLC. For example, the first set of parameters (and/or a first PUCCH configuration) may include a different maximum coding rate than a second set of parameters (and/or second PUCCH configuration).

As further shown in FIG. 7, and by reference number 730, BS 110 transmits a downlink communication with DCI. The downlink communication may include one or more packets associated with the type of service, which may indicate the type of service associated with the PUCCH transmission. For example, if the downlink communication is an eMBB communication, the PUCCH transmission may be associated with the eMBB services. Additionally, or alternatively, if the downlink communication is associated with a URLLC communication, the PUCCH transmission may be associated with the URLLC communication.

UE 120 may determine whether the DCI is associated with eMBB or URLLC. In some aspects, the DCI in the downlink communication may include an ACK/NACK resource indicator (ARI) field, referred to herein as a PUCCH resource indicator. In some aspects, UE 120 may determine a bitwidth (i.e., a number of bits) of the PUCCH resource indicator based at least in part on the type of service (e.g., eMBB or URLLC) to be used for the PUCCH transmission. For example, UE 120 may determine that the PUCCH resource indicator is 2 bits (e.g., indicating the number of resources of the sets of PUCCH resources is 4 or less), when the PUCCH transmission is associated with a URLLC transmission. As another example, UE 120 may determine that the PUCCH resource indicator is 3 bits (e.g., indicating the number of resources of the sets of PUCCH resources is 8 or less), when the PUCCH transmission is associated with an eMBB transmission.

As further shown in FIG. 7, and by reference number 740, UE 120 determines the type of service associated with the PUCCH transmission based at least in part on the downlink communication. In some aspects, UE 120 may determine the type of service based at least in part on the type of service used to receive and/or transmit a previous packet. For example, if the downlink communication is received via a first service, UE 120 may determine that the PUCCH transmission is to be transmitted using the first service and if the downlink communication is received via a second service, UE 120 may determine that the PUCCH transmission is to be transmitted using the second service.

As further shown in FIG. 7, and by reference number 750, UE 120 transmits the PUCCH transmission using the resources according to the resource configuration associated with the service type of the PUCCH transmission. Accordingly, using the DCI, UE 120 may determine which resource is to be used for the PUCCH transmission, and transmit the PUCCH transmission using that resource.

In some aspects, UE 120 may be configured with different PUCCH resource sets corresponding to the different services (e.g., eMBB and URLLC). UE 120 may determine which resources are to be used for the PUCCH transmission based at least in part on the configuration and the DCI within the received downlink communication that is related to the service type. For example, UE 120 may determine that the PUCCH transmission is associated with an eMBB service. In this case, UE 120 may select the PUCCH resource from the sets of resources configured for the eMBB service based at least in part on the configuration and the DCI within the received downlink communication. Additionally, or alternatively, UE 120 may determine that the PUCCH transmission is associated with a URLLC service. In this case, UE 120 may select the PUCCH resource from the sets of resources configured for the URLLC service based at least in part on the configuration and the DCI within the received downlink communication. The DCI may indicate a starting symbol, a number of OFDM symbols and resource blocks that are to be used, a PUCCH resource ID, and/or the like.

In some examples, when UE 120 uses a same PUCCH resource configuration for multiple types of services, UE 120 may refer to a table that indicates whether the PUCCH resources are to be used with URLLC or with eMBB (or with both). For example, UE 120 may refer to the following table identifying PUCCH resources for use with eMBB and URLLC:

TABLE 1

| PUCCH Resource ID | URLLC/eMBB flag |
|---|---|
| 0 | URLLC/eMBB (0) |
| 1 | URLLC/eMBB (1) |
| 2 | eMBB only |
| 3 | eMBB only |
| 4 | eMBB only |
| 5 | eMBB only |
| 6 | URLLC only (2) |
| 7 | URLLC only (3) | where the URLLC/eMBB flag identifies whether the PUCCH resource is to be used with URLLC PUCCH transmissions, eMBB PUCCH transmissions, or both URLLC and eMBB PUCCH transmissions. In some aspects, each PUCCH resource may have two separate identifiers (e.g., virtual IDs that are implicitly determined at the UE based at least in part on the URLLC/eMBB flag), one for URLLC and one for eMBB. As an example, for a PUCCH transmission associated with URLLC, UE 120 may receive PUCCH resource indicator=3 (indicating a URLLC ID of 3) in the DCI. Accordingly, UE 120, using the PUCCH resource indicator=3 and starting from resource #0, identifies resource #7 as the PUCCH resource for the PUCCH transmission, where resource #0 has a URLLC ID of 0, resource #1 has a URLLC ID of 1, resource #6 has a URLLC ID of 2, and resource #7 has a URLLC ID of 3. Accordingly, each resource #0-7 may have additional identifiers that are based at least in part on the type of service (e.g., eMBB or URLLC) that is associated with the PUCCH transmission.

In some aspects, UE 120 may use a starting symbol parameter to determine which PUCCH resource is to be used for the PUCCH transmission. The example starting symbol parameter, which may be included in the DCI, may be different for URLLC and eMBB. For example, for eMBB, the starting symbol parameter may refer to a relative index within a slot. Additionally, or alternatively, for URLLC, the starting symbol parameter may indicate a timing relative to a signaling (e.g., a K1 signaling in the DCI, which identifies when an ACK/NACK is to be transmitted).

In some aspects, to achieve transmit diversity (e.g., for a URLLC service PUCCH transmission), the PUCCH transmission may be transmitted over two or more resources of the sets of resources identified in the corresponding resource configuration. For example, for a PUCCH transmission associated with a URLLC service, the PUCCH transmission may be transmitted via at least two transmit antennas on two resources of the sets of resources allocated for the URLLC service to obtain transmit diversity gain. This can improve reliability of PUCCH transmissions within URLLC. In such cases, multiple PUCCH resources may be configured with a same identifier. Accordingly, if the DCI indicates that the PUCCH transmission is to be sent via a PUCCH resource with that identifier, the PUCCH transmission can be sent via multiple resources. In some cases, the DCI may indicate an index k and UE 120 may use PUCCH resources based at least in part on the index and a radio resource control (RRC) configuration M (e.g., which may be received via an RRC communication prior to receiving the DCI), which indicates the number of PUCCH resources that is allocated to the UE to transmit PUCCH. Accordingly, the k may be received dynamically and the M may be received semi-statically. UE 120 may use k and M to identify the PUCCH resources of the corresponding sets of resources that are to be used. For example, UE 120 may identify PUCCH resources with identifiers equal to M(k−1), M(k−1)+1, . . . , Mk−1. Additionally, or al ternatively, the UE 120 may identify PUCCH resources with identifiers equal to k, k+1, . . . , k+M−1. In some aspects, different or additional PUCCH formats can be used to achieve transmit diversity. For example, certain PUCCH formats may be configured for URLLC but not for eMBB. In some aspects, the schemes discussed above in connection with transmit diversity may be applied for URLLC PUCCH transmissions but not applied for eMBB PUCCH transmissions.

A downlink assignment index (DAI) may be used to indicate the number of physical downlink shared channel (PDSCH) communications that the UE 120 has received up to the current DCI. For example, the UE 120 may receive an indication of a counter DAI and/or a total DAI. The value of the counter DAI may denote the accumulative number of serving cell PDCCH monitoring occasions in which PDSCH reception or SPS PDSCH release is present, up to the current serving cell and current PDCCH monitoring occasion. The value of total DAI, when present, may denote the total number of serving cell PDCCH monitoring occasion pair in which PDSCH reception and SPS PDSCH release is present, up to the current PDCCH monitoring occasion. In some aspects, the UE 120 may track and/or store different sets of DAIs for URLLC and eMBB, and may perform separate DAI counting and/or DAI accumulation for URLLC and eMBB. For example, the UE 120 may keep track of and/or store two sets of DAIs, where the first set of {counter DAI, total DAI} applies to URLLC transmissions only and the second set of {counter DAI, total DAI} applies to eMBB transmissions only. In this case, the URLLC DAI does not count toward the eMBB DAI, and vice versa. In some aspects, UE 120, based at least in part on the PUCCH resource configurations, may be configured to perform separate DAI operations for different types of services. For example, uplink control information (UCI) in the PUCCH transmission may be determined according to a first downlink assignment index (DAI) operation when the PUCCH transmission is associated with eMBB, and the UCI in the PUCCH transmission may be determined according to a second DAI operation when the PUCCH transmission is associated with URLLC.

UE 120 may determine whether the DCI is associated with eMBB or URLLC. In some aspects, the DCI in the downlink communication may include a DAI field. In some aspects, UE 120 may determine a bitwidth (i.e., a number of bits) of the DAI based at least in part on the type of service (e.g., eMBB or URLLC) to be used for the PUCCH transmission. For example, UE 120 may determine that the DAI is 1 bit, when the PUCCH transmission is associated with a URLLC transmission. As another example, UE 120 may determine that the DAI is 2 bits, when the PUCCH transmission is associated with an eMBB transmission.

The example PUCCH transmission may be an ACK/NACK. The ACK/NACK may be sent dynamically (e.g., in response to receiving the downlink communication), and/or according to semi-persistent scheduling (SPS). In some aspects, different DAI operations may be performed with respect to ACK/NACK bundling for URLLC as compared to eMBB. More specifically, UE 120 may not multiplex between URLLC and eMBB when sending PUCCH transmissions.

Accordingly, the ACK/NACK for receipt of URLLC packets may be sent in a separate PUCCH transmission from an ACK/NACK for receipt of eMBB packets. In some aspects, when ACK/NACKs for both URLLC and eMBB overlap in time, the eMBB ACK/NACK may be dropped (e.g., to meet the low latency and high reliability requirement of URLLC). However, if the transmissions are to occur in the same slot, but are not overlapping, then the eMBB ACK/NACK may not be dropped. For example, if a first PUCCH transmission is scheduled on symbols 1-5 and a second PUCCH transmission is scheduled on symbols 6-10, then neither the first PUCCH transmission nor the second PUCCH transmission is dropped. Additionally, or alternatively, when two transmissions are configured to partially overlap, the overlapping portion of the eMBB PUCCH transmission may be dropped. For example, if an eMBB PUCCH transmission is on symbols 1-10 and an URLLC PUCCH transmission is to be on symbols 7-11, then data in symbols 7-10 for the eMBB PUCCH transmission may be dropped.

In some aspects, the PUCCH transmission may include a service request (SR) (e.g., to request uplink resources) and/or a channel state information (CSI) report (e.g., to indicate a status of the channel used to receive the downlink communication).

As indicated above, FIG. 7 is provided as an example. Other examples may differ from what is described with respect to FIG. 7.

Figure 8:
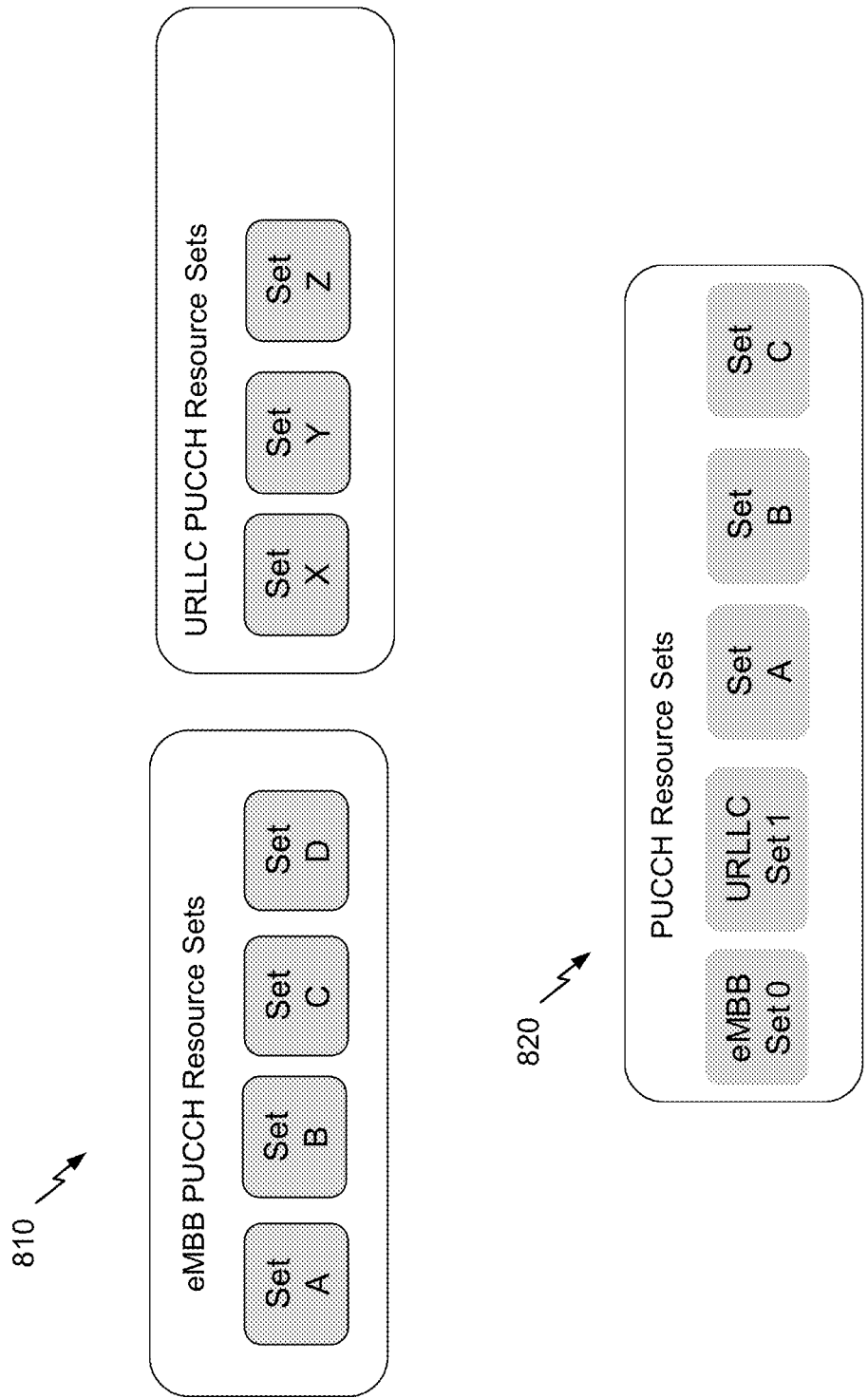

FIG. 8 is a diagram illustrating examples 810 and 820 of allocating PUCCH resources for URLLC. In FIG. 8, diagrams of resources that may be allocated according to a type of service (e.g., eMBB or URLLC) are shown. As shown by example 810, eMBB PUCCH resource sets may be different from PUCCH resource sets allocated for URLLC. For example, eMBB PUCCH resources may include sets A, B, C, D and URLLC PUCCH resource sets may include sets X, Y, Z. Furthermore, as shown by example 810, different amounts of resource sets may be allocated based at least in part on the type of service. For example, four PUCCH resource sets A, B, C, D are allocated for eMBB, while three resource sets X, Y, Z are allocated for URLLC.

As shown by example 820, in some aspects, a same set of PUCCH resources may be shared for multiple types of services and some resource sets may be used for particular types of resource sets. For example, both eMBB and URLLC may use sets ABC, but only eMBB may use set 0 and only URLLC may use set 1. Accordingly, PUCCH resource sets can be allocated for PUCCH transmissions based at least in part on the type of PUCCH transmission.

As indicated above, FIG. 8 is provided as an example. Other examples may differ from what is described with respect to FIG. 8.

Figure 9:
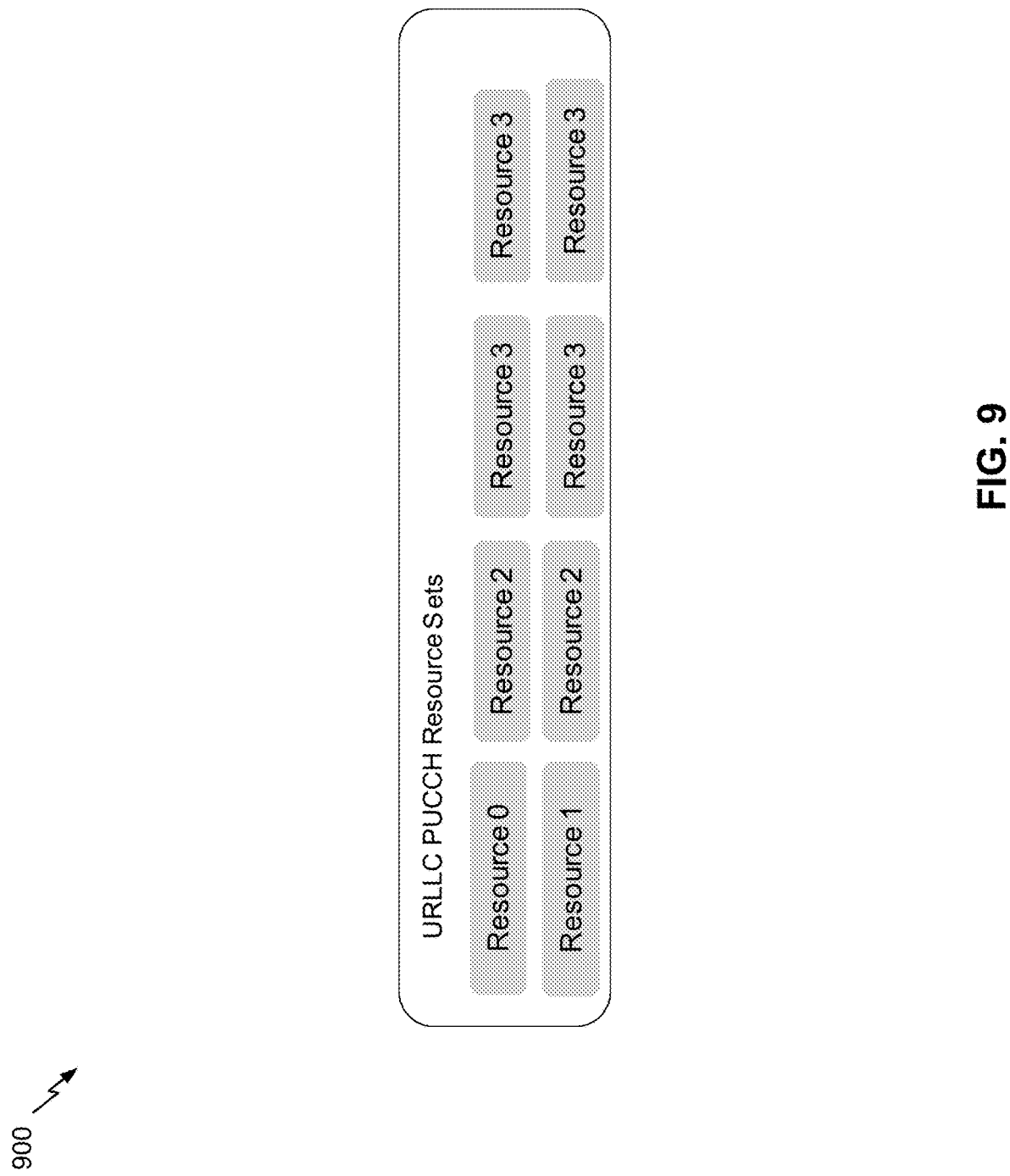

FIG. 9 is a diagram illustrating an example 900 of allocating PUCCH resources for URLLC. As shown by example 900, to achieve transmit diversity, multiple resources within a set of resources may be assigned a same resource ID. In FIG. 9, two resources have ID=2 and four resources have ID=3. Accordingly, when UE 120 determines that a PUCCH transmission is to be transmitted via a PUCCH resource with ID=2, UE 120 may transmit the PUCCH transmission via two resources. Similarly, when UE 120 determines that a PUCCH transmission is to be transmitted via a PUCCH resource with ID=3, UE 120 may transmit the PUCCH transmission via four resources. In some aspects, the two PUCCH resources or the four PUCCH resources may be associated with the same time-domain resources (e.g., may be configured on the same OFDM symbols), in which case the UE 120 transmits PUCCHs on these indicated PUCCH resources simultaneously from different transmit antennas to achieve spatial diversity.

As indicated above, FIG. 9 is provided as an example. Other examples may differ from what is described with respect to FIG. 9.

Figure 10:
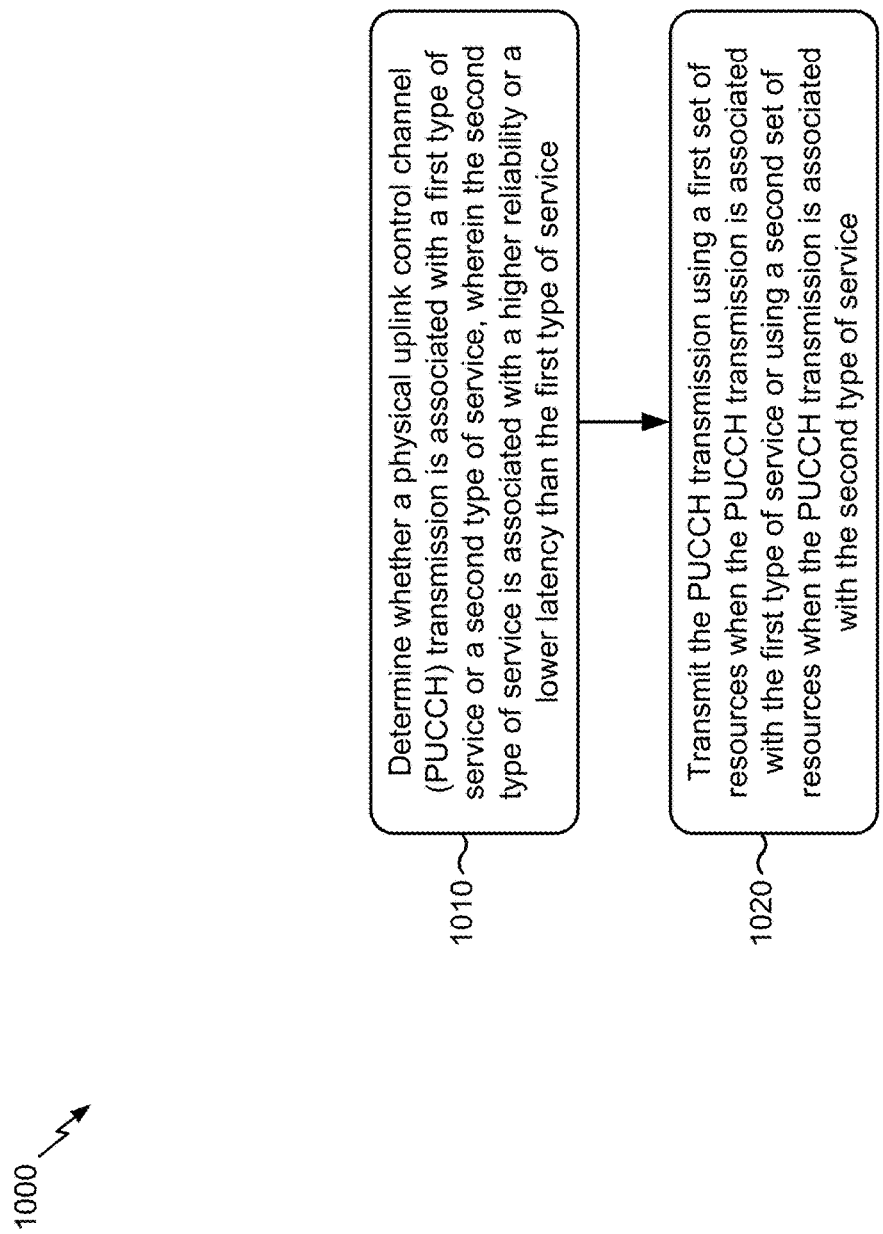
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with identifying PUCCH resources and sending a PUCCH transmission using PUCCH resources allocated in accordance with some examples described herein.

As shown in FIG. 10, in some aspects, process 1000 may include determining whether a PUCCH transmission is associated with a first type of service or a second type of service, wherein the second type of service is associated with a higher reliability or a lower latency than the first type of service (block 1010). For example, the UE (e.g., using receive processor 258, transmit processor 264, controller/processor 280, memory 282, and/or the like) may determine whether a PUCCH transmission is associated with a first type of service or a second type of service, as described above. In some aspects, the second type of service is associated with a higher reliability or a lower latency than the first type of service.

As further shown in FIG. 10, in some aspects, process 1000 may include transmitting the PUCCH transmission using a first set of resources when the PUCCH transmission is associated with the first type of service or using a second set of resources when the PUCCH transmission is associated with the second type of service (block 1020). For example, the UE (e.g., using receive processor 258, transmit processor 264, controller/processor 280, memory 282, and/or the like) may transmit the PUCCH transmission using a first set of resources when the PUCCH transmission is associated with the first type of service or using a second set of resources when the PUCCH transmission is associated with the second type of service, as described above.

Process 1000 may include additional aspects, such as any single aspect or any combination of aspects described below and/or in connection with one or more other processes described elsewhere herein.

In a first aspect, the first type of service comprises an enhanced mobile broadband (eMBB) service and the second type of service comprises an ultra-reliable, low-latency communication (URLLC) service.

In a second aspect, alone or in combination with the first aspect, the first set of resources includes multiple resource sets configured for the first type of service.

In a third aspect, alone or in combination with one or more of the first and second aspects, the second set of resources includes multiple resource sets configured for the second type of service.

In a fourth aspect, alone or in combination with one or more of the first through third aspects, the PUCCH transmission comprises at least one of: an acknowledgement and/or negative acknowledgement (ACK/NACK), a service request (SR), or a channel state information (CSI) report.

In a fifth aspect, alone or in combination with one or more of the first through fourth aspects, the ACK/NACK is associated with dynamic scheduling or semi-persistent scheduling (SPS).

In a sixth aspect, alone or in combination with one or more of the first through fifth aspects, the first set of resources includes four resource sets, and the second set of resources includes fewer than four resource sets.

In a seventh aspect, alone or in combination with one or more of the first through sixth aspects, the first set of resources is different than the second set of resources.

In an eighth aspect, alone or in combination with one or more of the first through seventh aspects, a number of resource sets in the second set of resources is less than a number of resource sets in the first set of resources.

In a ninth aspect, alone or in combination with one or more of the first through eighth aspects, at least one resource set of the first set of resources is a same resource set as a resource set included in the second set of resources.

In a tenth aspect, alone or in combination with one or more of the first through ninth aspects, a number of resources within each set of the second set of resources is less than a number of resources within each set of the first set of resources.

In an eleventh aspect, alone or in combination with one or more of the first through tenth aspects, the UE is configured to determine a number of resources within each set of the first set of resources or the second set of resources based at least in part on a bitwidth of a PUCCH resource indicator field in downlink control information (DCI) received from a base station in association with the PUCCH transmission.

In a twelfth aspect, alone or in combination with one or more of the first through eleventh aspects, the PUCCH transmission is transmitted over two or more resources of the second set of resources based at least in part on a determination that the PUCCH transmission is associated with the second type of service.

In a thirteenth aspect, alone or in combination with one or more of the first through twelfth aspects, the PUCCH transmission is transmitted via at least two transmit antennas on two resources of the second set of resources based at least in part on a determination that the PUCCH transmission is associated with the second type of service.

In a fourteenth aspect, alone or in combination with one or more of the first through thirteenth aspects, at least two resources of one set of the second set of resources share a same identifier and the PUCCH transmission is transmitted using the at least two resources when the identifier is received in association with the PUCCH transmission.

In a fifteenth aspect, alone or in combination with one or more of the first through fourteenth aspects, the PUCCH transmission is transmitted using one or more resources of the second set of resources based at least in part on receiving, from a base station, an index and a semi-statically received configuration in association with the PUCCH transmission.

In a sixteenth aspect, alone or in combination with one or more of the first through fifteenth aspects, resources of the second set of resources are identified for use in connection with the PUCCH transmission differently than resources of the first set of resources.

In a seventeenth aspect, alone or in combination with one or more of the first through sixteenth aspects, the resources of the second set of resources are identified for use in connection with the PUCCH transmission differently than the resources of the first set of resources in connection with using a different PUCCH format.

In an eighteenth aspect, alone or in combination with one or more of the first through seventeenth aspects, a resource of the first set of resources is identified for use in association with the first type of service based at least in part on a first value of a parameter associated with the resource of the first set of resources, or a resource of the second set of resources is identified for use in association with the second type of service based at least in part on a second value of the parameter associated with the resource of the second set of resources.

In a nineteenth aspect, alone or in combination with one or more of the first through eighteenth aspects, for a resource of the PUCCH transmission, a parameter indicates whether the resource is associated with the first type of service, the second type of service, or both the first type of service and the second type of service based at least in part on a value of the parameter.

In a twentieth aspect, alone or in combination with one or more of the first through nineteenth aspects, the parameter is included within a configuration of the resource for the PUCCH transmission.

In a twenty-first aspect, alone or in combination with one or more of the first through twentieth aspects, the value of the parameter indicates that a same resource of the first set of resources and the second set of resources is associated with the first type of service and the second type of service.

In a twenty-second aspect, alone or in combination with one or more of the first through twenty-first aspects, the first set of resources is a same set of resources as the second set of resources. In some aspects, each resource of the same set of resources is associated with a first identifier for the PUCCH transmission when the PUCCH transmission is associated with the first type of service and a second identifier for the PUCCH transmission when the PUCCH transmission is associated with the second type of service.

In a twenty-third aspect, alone or in combination with one or more of the first through twenty-second aspects, the PUCCH transmission is transmitted using one of the same set of resources based at least in part on receiving downlink control information that indicates an index associated with the first type of service or the second type of service.

In a twenty-fourth aspect, alone or in combination with one or more of the first through twenty-third aspects, a starting symbol parameter identifies a different starting symbol when the PUCCH transmission is associated with the first type of service than when the PUCCH transmission is associated with the second type of service.

In a twenty-fifth aspect, alone or in combination with one or more of the first through twenty-fourth aspects, the starting symbol parameter when the PUCCH transmission is associated with the first type of service identifies a relative index with a slot for the PUCCH transmission.

In a twenty-sixth aspect, alone or in combination with one or more of the first through twenty-fifth aspects, the starting symbol parameter when the PUCCH transmission is associated with the second type of service identifies a timing associated with signaling in downlink control information (DCI).

In a twenty-seventh aspect, alone or in combination with one or more of the first through twenty-sixth aspects, uplink control information (UCI) in the PUCCH transmission is determined according to a first downlink assignment index (DAI) operation when the PUCCH transmission is associated with the first type of service and the UCI in the PUCCH transmission is determined according to a second DAI operation when the PUCCH transmission is associated with the second type of service.

In a twenty-eighth aspect, alone or in combination with one or more of the first through twenty-seventh aspects, when the PUCCH transmission is a first PUCCH transmission associated with the first type of service, and a second PUCCH transmission associated with the second type of service is to be transmitted on using symbols that overlap with the symbols of the first PUCCH transmission, the symbols that overlap are dropped from the first PUCCH transmission.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
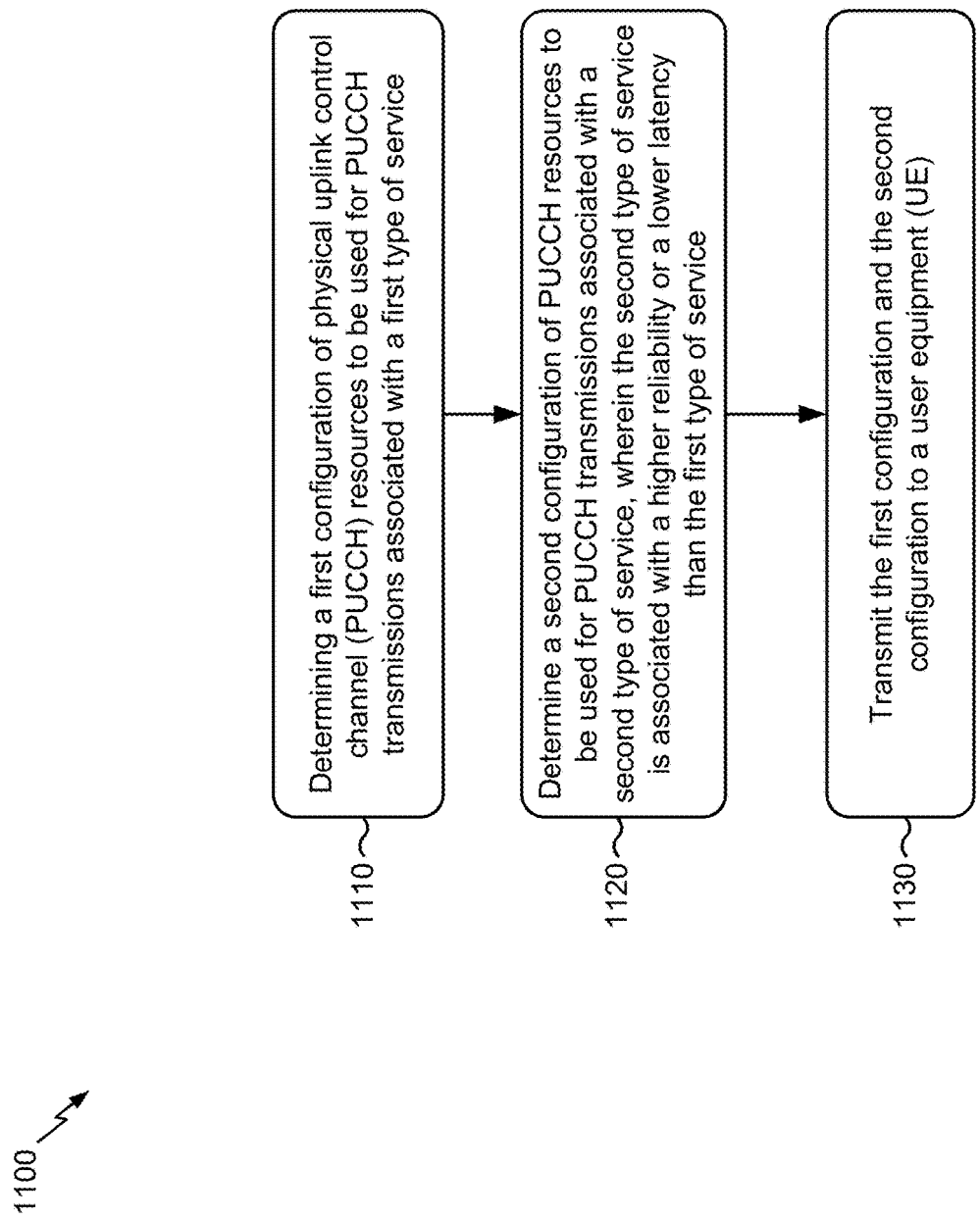
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where a base station (e.g., base station 110 and/or the like) performs operations associated with allocation of PUCCH resources in connection with a type of service associated with a PUCCH transmission.

As shown in FIG. 11, in some aspects, process 1100 may include determining a first configuration of PUCCH resources to be used for PUCCH transmissions associated with a first type of service (block 1110). For example, the base station (e.g., using controller/processor 240, memory 242, and/or the like) may determine a first configuration of PUCCH resources to be used for PUCCH transmissions associated with a first type of service, as described above.

As further shown in FIG. 11, in some aspects, process 1100 may include determining a second configuration of PUCCH resources to be used for PUCCH transmissions associated with a second type of service, wherein the second type of service is associated with a higher reliability or a lower latency than the first type of service (block 1120). For example, the base station (e.g., using controller/processor 240, memory 242, and/or the like) may determine a second configuration of PUCCH resources to be used for PUCCH transmissions associated with a second type of service, as described above. In some aspects, the second type of service is associated with a higher reliability or a lower latency than the first type of service.

As further shown in FIG. 11, in some aspects, process 1100 may include transmitting the first configuration and the second configuration to a user equipment (UE) (block 1130). For example, the base station (e.g., using transmit processor 220, controller/processor 240, memory 242, and/or the like) may transmit the first configuration and the second configuration to a UE, as described above.

Process 1100 may include additional aspects, such as any single aspect or any combination of aspects described below and/or in connection with one or more other processes described elsewhere herein.

In a first aspect, the first type of service comprises an enhanced mobile broadband (eMBB) service and the second type of service comprises an ultra-reliable, low-latency communication (URLLC) service.

In a second aspect, alone or in combination with the first aspect, the first configuration is different from the second configuration.

In a third aspect, alone or in combination with one or more of the first and second aspects, sets of PUCCH resources included in the first configuration are different than sets of PUCCH resources included in the second configuration.

In a fourth aspect, alone or in combination with one or more of the first through third aspects, the second configuration includes fewer sets of PUCCH resources than the first configuration.

In a fifth aspect, alone or in combination with one or more of the first through fourth aspects, a number of PUCCH resources in each set of PUCCH resources included in the second configuration is less than a number of PUCCH resources in each set of PUCCH resources included in the first configuration.

In a sixth aspect, alone or in combination with one or more of the first through fifth aspects, a bitwidth of a PUCCH resource indicator in downlink control information (DCI) corresponds to the second type of service according to a number of PUCCH resources in each set of PUCCH resources included in the second configuration.

In a seventh aspect, alone or in combination with one or more of the first through sixth aspects, for each PUCCH resource of the first configuration and the second configuration, a parameter indicates whether the PUCCH resource is associated with the first type of service, the second type of service, or both the first type of service and the second type of service.

In an eighth aspect, alone or in combination with one or more of the first through seventh aspects, a first set of resources of the first configuration is a same set of resources as a second set of resources of the second configuration, and each resource of the same set of resources is associated with a first identifier for a PUCCH transmission when the PUCCH transmission is associated with the first type of service and a second identifier for the PUCCH transmission when the PUCCH transmission is associated with the second type of service.

In a ninth aspect, alone or in combination with one or more of the first through eighth aspects, the first configuration is one of a first plurality of configurations of PUCCH resources to be used for PUCCH transmissions associated with the first type.

In a tenth aspect, alone or in combination with one or more of the first through ninth aspects, a maximum coding rate of the first configuration is different than a maximum coding rate of the second configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
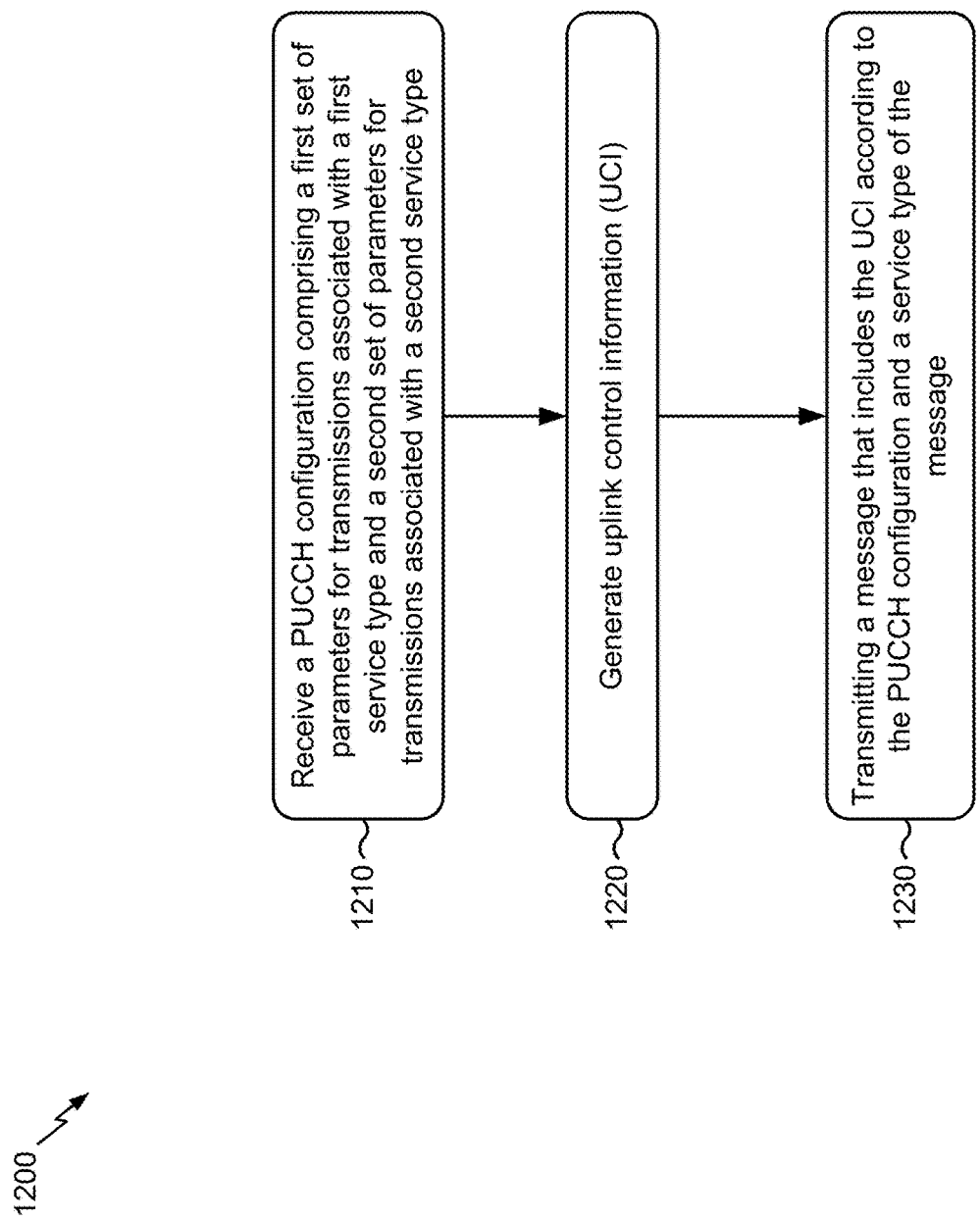
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where a UE (e.g., UE 120 and/or the like) performs operations associated with using a PUCCH configuration, configured according to a type of service, to transmit a message associated with that type of service.

As shown in FIG. 12, in some aspects, process 1200 may include receiving a PUCCH configuration comprising a first set of parameters for transmissions associated with a first service type and a second set of parameters for transmissions associated with a second service type (block 1210). For example, the UE (e.g., using receive processor 258, controller/processor 280, memory 282, and/or the like) may receive a PUCCH configuration comprising a first set of parameters for transmissions associated with a first service type and a second set of parameters for transmissions associated with a second service type, as described above.

As further shown in FIG. 12, in some aspects, process 1200 may include generating uplink control information (UCI) (block 1220). For example, the UE (e.g., using transmit processor 264, controller/processor 280, memory 282, and/or the like) may generate UCI, as described above.

As further shown in FIG. 12, in some aspects, process 1200 may include transmitting a message that includes the UCI according to the PUCCH configuration and a service type of the message (block 1230). For example, the UE (e.g., using transmit processor 264, controller/processor 280, memory 282, and/or the like) may transmit a message that includes the UCI according to the PUCCH configuration and a service type of the message, as described above.

Process 1200 may include additional aspects, such as any single aspect or any combination of aspects described below and/or in connection with one or more other processes described elsewhere herein.

In a first aspect, the service type of the message is determined based at least in part on downlink control information (DCI) received from a base station.

In a second aspect, alone or in combination with the first aspect, a maximum coding rate indicated by the first set of parameters is different than a maximum coding rate indicated by the second set of parameters.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
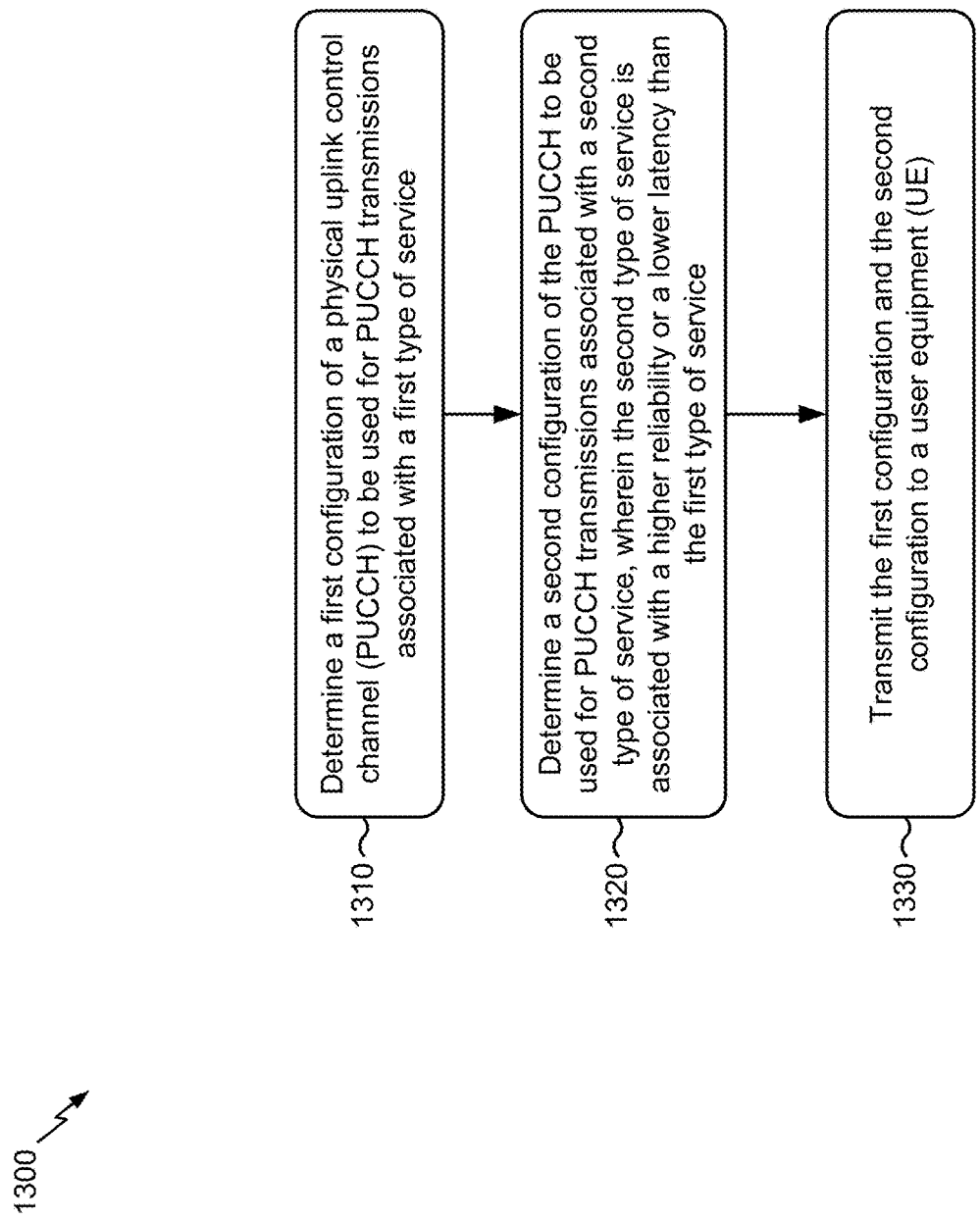
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where a BS (e.g., BS 110 and/or the like) performs PUCCH configuration for a plurality of types of services (e.g., eMBB and URLLC).

As shown in FIG. 13, in some aspects, process 1300 may include determining a first configuration of a PUCCH to be used for PUCCH transmissions associated with a first type of service (block 1310). For example, BS 110 (e.g., using transmit processor 220, TX MIMO processor 230, controller/processor 240, and/or the like) may determine a first configuration of a PUCCH to be used for PUCCH transmissions associated with a first type of service, as described above. In some aspects, BS 110 may determine the first configuration in connection with receiving an indication that UE 120 is capable of communicating via the first type of service.

As shown in FIG. 13, in some aspects, process 1300 may include determining a second configuration of the PUCCH to be used for PUCCH transmissions associated with a second type of service, wherein the second type of service is associated with a higher reliability or a lower latency than the first type of service (block 1320). For example, BS 110 (e.g., using transmit processor 220, TX MIMO processor 230, controller/processor 240, and/or the like) may determine a second configuration of the PUCCH to be used for PUCCH transmissions associated with a second type of service, as described above. In some aspects, the second type of service is associated with a higher reliability or a lower latency than the first type of service. In some aspects, BS 110 may determine the second configuration in connection with receiving an indication that UE 120 is capable of communicating via the second type of service.

As shown in FIG. 13, in some aspects, process 1300 may include transmitting the first configuration and the second configuration to a user equipment (UE) (block 1330). For example, BS 110 (e.g., using transmit processor 220, TX MIMO processor 230, modulator 232, antenna 234, controller/processor 240, and/or the like) may transmit the first configuration and the second configuration to UE 120, as described above. In some aspects, BS 110 may transmit the first configuration and the second configuration in connection with determining the first configuration and the second configuration.

Process 1300 may include additional aspects, such as any single aspect or any combination of aspects described below and/or in connection with one or more other processes described elsewhere herein.

In a first aspect, the first type of service comprises an enhanced mobile broadband (eMBB) service and the second type of service comprises an ultra-reliable, low-latency communication (URLLC) service.

In a second aspect, alone or in combination with the first aspect, a maximum coding rate of the first configuration of the PUCCH is different than a maximum coding rate of the second PUCCH configuration.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining whether a physical uplink control channel (PUCCH) transmission is associated with a first type of service or a second type of service, wherein the second type of service is associated with a higher reliability or a lower latency than the first type of service; and
    transmitting the PUCCH transmission based at least in part on a first set of resources when the PUCCH transmission is associated with the first type of service or based at least in part on a second set of resources when the PUCCH transmission is associated with the second type of service,
        wherein the PUCCH transmission is determined based on a downlink assignment index (DAI) field included in downlink control information (DCI), and
        wherein a first bitwidth of the DAI field for the first type of service is different than a second bitwidth of the DAI field for the second type of service.

2. The method of claim 1, wherein the first type of service comprises an enhanced mobile broadband (eMBB) service and the second type of service comprises an ultra-reliable, low-latency communication (URLLC) service.

3. The method of claim 1, wherein the first set of resources includes multiple resource sets configured for the first type of service.

4. The method of claim 1, wherein the second set of resources includes multiple resource sets configured for the second type of service.

5. The method of claim 1, wherein the PUCCH transmission comprises at least one of:
    hybrid automatic repeat request acknowledgement (HARQ-ACK) information,
    a service request (SR), or
    a channel state information (CSI) report.

6. The method of claim 5, wherein the ACK/NACK is associated with dynamic scheduling or semi-persistent scheduling (SPS).

7. The method of claim 1, wherein the first set of resources includes four resource sets, and wherein the second set of resources includes fewer than four resource sets.

8. The method of claim 1, wherein the first set of resources is different than the second set of resources.

9. The method of claim 1, wherein a number of resource sets in the second set of resources is less than a number of resource sets in the first set of resources.

10. The method of claim 1, wherein at least one resource set of the first set of resources is a same resource set as a resource set included in the second set of resources.

11. The method of claim 1, wherein a number of resources within each set of the second set of resources is less than a number of resources within each set of the first set of resources.

12. The method of claim 1, wherein the UE is configured to determine a number of resources within each set of the first set of resources or the second set of resources based at least in part on a bitwidth of a PUCCH resource indicator field in DCI received from a base station in association with the PUCCH transmission.

13. The method of claim 1, wherein the PUCCH transmission is transmitted over two or more resources of the second set of resources based at least in part on a determination that the PUCCH transmission is associated with the second type of service.

14. The method of claim 1, wherein the PUCCH transmission is transmitted via at least two transmit antennas on two resources of the second set of resources based at least in part on a determination that the PUCCH transmission is associated with the second type of service.

15. The method of claim 1, wherein at least two resources of one set of the second set of resources share a same identifier and the PUCCH transmission is transmitted using the at least two resources when the same identifier is received in association with the PUCCH transmission.

16. The method of claim 1, wherein the PUCCH transmission is transmitted using one or more resources of the second set of resources based at least in part on receiving, from a base station, an index and a semi-statically received configuration in association with the PUCCH transmission.

17. The method of claim 1, wherein resources of the second set of resources are identified for use in connection with the PUCCH transmission differently than resources of the first set of resources.

18. The method of claim 17, wherein the resources of the second set of resources are identified for use in connection with the PUCCH transmission differently than the resources of the first set of resources in connection with using a different PUCCH format.

19. The method of claim 1, wherein a resource of the first set of resources is identified for use in association with the first type of service based at least in part on a first value of a parameter associated with the resource of the first set of resources or a resource of the second set of resources is identified for use in association with the second type of service based at least in part on a second value of the parameter associated with the resource of the second set of resources.

20. The method of claim 1, wherein, for a resource of the PUCCH transmission, a parameter indicates whether the resource is associated with the first type of service, the second type of service, or both the first type of service and the second type of service based at least in part on a value of the parameter.

21. The method of claim 20, wherein the parameter is included within a configuration of the resource for the PUCCH transmission.

22. The method of claim 20, wherein the value of the parameter indicates that a same resource of the first set of resources and the second set of resources is associated with the first type of service and the second type of service.

23. The method of claim 1, wherein the first set of resources is a same set of resources as the second set of resources, and wherein each resource of the same set of resources is associated with a first identifier for the PUCCH transmission when the PUCCH transmission is associated with the first type of service and a second identifier for the PUCCH transmission when the PUCCH transmission is associated with the second type of service.

24. The method of claim 23, wherein the PUCCH transmission is transmitted using one of the same set of resources based at least in part on receiving downlink control information that indicates an index associated with the first type of service or the second type of service.

25. The method of claim 1, wherein a starting symbol parameter identifies a different starting symbol when the PUCCH transmission is associated with the first type of service than when the PUCCH transmission is associated with the second type of service.

26. The method of claim 25, wherein the starting symbol parameter when the PUCCH transmission is associated with the first type of service identifies a relative index with a slot for the PUCCH transmission.

27. The method of claim 25, wherein the starting symbol parameter when the PUCCH transmission is associated with the second type of service identifies a timing associated with signaling in DCI.

28. The method of claim 1, wherein hybrid automatic repeat request acknowledgement (HARQ-ACK) information in the PUCCH transmission is determined according to a first DAI operation when the PUCCH transmission is associated with the first type of service and the HARQ-ACK information in the PUCCH transmission is determined according to a second DAI operation when the PUCCH transmission is associated with the second type of service.

29. The method of claim 1, wherein, when the PUCCH transmission is a first PUCCH transmission associated with the first type of service, and a second PUCCH transmission associated with the second type of service is to be transmitted on using symbols that overlap with the symbols of the first PUCCH transmission, the symbols that overlap are dropped from the first PUCCH transmission.

30. A method of wireless communication performed by a base station (BS), comprising:
   determining a first configuration of physical uplink control channel (PUCCH) resources to be used for PUCCH transmissions associated with a first type of service;
   determining a second configuration of PUCCH resources to be used for PUCCH transmissions associated with a second type of service, wherein the second type of service is associated with a higher reliability or a lower latency than the first type of service;
   transmitting the first configuration and the second configuration to a user equipment (UE); and
   transmitting downlink control information (DCI) that includes a downlink assignment index (DAI) field associated with a PUCCH transmission,
      wherein a first bitwidth of the DAI field for the first type of service is different than a second bitwidth of the DAI field for the second type of service.

31. The method of claim 30, wherein the first type of service comprises an enhanced mobile broadband (eMBB) service and the second type of service comprises an ultra-reliable, low-latency communication (URLLC) service.

32. The method of claim 30, wherein the first configuration is different from the second configuration.

33. The method of claim 30, wherein sets of PUCCH resources included in the first configuration are different than sets of PUCCH resources included in the second configuration.

34. The method of claim 30, wherein the second configuration includes fewer sets of PUCCH resources than the first configuration.

35. The method of claim 30, wherein a number of PUCCH resources in each set of PUCCH resources included in the second configuration is less than a number of PUCCH resources in each set of PUCCH resources included in the first configuration.

36. The method of claim 30, wherein a bitwidth of a PUCCH resource indicator in DCI corresponds to the second type of service according to a number of PUCCH resources in each set of PUCCH resources included in the second configuration.

37. The method of claim 30, wherein, for each PUCCH resource of the first configuration and the second configuration, a parameter indicates whether the PUCCH resource is associated with the first type of service, the second type of service, or both the first type of service and the second type of service.

38. The method of claim 30, wherein a first set of resources of the first configuration is a same set of resources as a second set of resources of the second configuration, and wherein each resource of the same set of resources is associated with a first identifier for a PUCCH transmission when the PUCCH transmission is associated with the first type of service and a second identifier for the PUCCH transmission when the PUCCH transmission is associated with the second type of service.

39. The method of claim 30, wherein the first configuration is one of a first plurality of configurations of PUCCH resources to be used for PUCCH transmissions associated with the first type.

40. The method of claim 30, wherein a maximum coding rate of the first configuration is different than a maximum coding rate of the second configuration.

41. A user equipment (UE) for wireless communication, comprising:
   memory; and
   one or more processors coupled to the memory, the memory and the one or more processors configured to:
      determine whether a physical uplink control channel (PUCCH) transmission is associated with a first type of service or a second type of service, wherein the second type of service is associated with a higher reliability or a lower latency than the first type of service; and
      transmit the PUCCH transmission using a first set of resources when the PUCCH transmission is associated with the first type of service or using a second set of resources when the PUCCH transmission is associated with the second type of service,
         wherein the PUCCH transmission is determined based on a downlink assignment index (DAI) field included in downlink control information (DCI), and
         wherein a first bitwidth of the DAI field for the first type of service is different than a second bitwidth of the DAI field for the second type of service.

42. The UE of claim 41, wherein a bitwidth of the DAI field is based on a type of service associated with the PUCCH transmission.

43. A method of wireless communication performed by a base station (BS), comprising:

determining a first configuration of physical uplink control channel (PUCCH) resources to be used for PUCCH transmissions associated with a first type of service;

determining a second configuration of PUCCH resources to be used for PUCCH transmissions associated with a second type of service, wherein the second type of service is associated with a higher reliability or a lower latency than the first type of service;

transmitting the first configuration and the second configuration to a user equipment (UE); and transmitting downlink control information (DCI) that includes a downlink assignment index (DAI) field associated with a PUCCH transmission, wherein a first bitwidth of the DAI field for the first type of service is different than a second bitwidth of the DAI field for the second type of service.

44. The method of claim 1, wherein a bitwidth of the DAI field is based on a type of service associated with the PUCCH transmission.

\* \* \* \* \*